United States Patent
Adachi et al.

(10) Patent No.: US 7,356,240 B2
(45) Date of Patent: Apr. 8, 2008

(54) PROCESSING METHOD OF POLYMER CRYSTAL, PROCESSING SYSTEM OF POLYMER CRYSTAL, AND OBSERVATION SYSTEM OF POLYMER CRYSTAL

(75) Inventors: Hiroaki Adachi, 1-20-17 Segawa, Minoo-shi, Osaka, 562-0045 (JP); Hiroshi Kitano, Yokohama (JP)

(73) Assignees: Nikon Corporation, Tokyo (JP); Hiroaki Adachi, Minoo-shi (JP)

( * ) Notice: Subject to any disclaimer, the term of this patent is extended or adjusted under 35 U.S.C. 154(b) by 0 days.

(21) Appl. No.: 11/372,382

(22) Filed: Mar. 9, 2006

(65) Prior Publication Data
US 2006/0171656 A1    Aug. 3, 2006

Related U.S. Application Data

(63) Continuation of application No. PCT/JP2004/013577, filed on Sep. 10, 2004.

(30) Foreign Application Priority Data

| Sep. 11, 2003 | (JP) | ............................. 2003-320190 |
| Jan. 28, 2004 | (JP) | ............................. 2004-019516 |
| May 7, 2004 | (JP) | ............................. 2004-137991 |

(51) Int. Cl.
| G02B 6/00 | (2006.01) |
| A61N 5/00 | (2006.01) |
| B23K 26/00 | (2006.01) |
| G02B 6/26 | (2006.01) |
| B23K 26/02 | (2006.01) |
| B23K 26/04 | (2006.01) |
| B23K 26/08 | (2006.01) |

(52) U.S. Cl. ...................... 385/147; 385/31; 250/492.2; 219/121.67; 219/121.7; 219/121.73; 219/121.78; 219/121.82

(58) Field of Classification Search .................. 385/31, 385/33; 219/121.6–121.83
See application file for complete search history.

(56) References Cited

U.S. PATENT DOCUMENTS 5,593,606 A * 1/1997 Owen et al. ........... 219/121.71

(Continued)

FOREIGN PATENT DOCUMENTS

JP         57-118882 A        7/1982

(Continued)

OTHER PUBLICATIONS

Jenkins, et al "Glossary of Basic Terms in Polymer Science (IUPAC Recommendations 1996)." Pure Appl. Chem., vol. No. 68, 8, pp. 1591-1595, 1996.*

(Continued)

*Primary Examiner*—Michelle Connelly-Cushwa
*Assistant Examiner*—Rhonda S. Peace
(74) *Attorney, Agent, or Firm*—Frishauf, Holtz, Goodman & Chick , P.C.

(57) ABSTRACT

The ultraviolet short-pulse laser light emitted from the ultraviolet short-pulse laser light source 1 is focused on and caused to irradiate a macromolecular crystal 8 contained in a sample container 6 via a shutter 2, intensity adjusting element 3, irradiation position control mechanism 4, and focusing optical system 5. The sample container 6 is carried on a stage 7, and can be moved in three dimensions along the directions of the x, y and z axes in an x-y-z orthogonal coordinate system with the direction of the optical axis being taken as the z axis; furthermore, the sample container 6 can be rotated about the z axis. Working of the macromolecular crystal is performed by means of ultraviolet short-pulse laser light that is focused on and caused to irradiate the surface of the macromolecular crystal 8. In this way, various types of working can be securely performed on macromolecular crystals with little damage and by means of a simple operation.

15 Claims, 21 Drawing Sheets

U.S. PATENT DOCUMENTS

2003/0034093 A1* 2/2003 Morris et al. ............... 148/197
2006/0078012 A1* 4/2006 Miwa ......................... 372/22

FOREIGN PATENT DOCUMENTS

| JP | 63-5892 A | 1/1988 |
|---|---|---|
| JP | 8-43325 A | 2/1996 |
| JP | 09-136698 A | 5/1997 |
| JP | 2001-122993 A | 5/2001 |
| JP | 2003-71828 A | 3/2003 |

OTHER PUBLICATIONS

"Protein Crystal Processing, X-Ray Diffraction Pattern Improved; Osaka Univ. and Nikon: Use of UV Laser," Business & Technology, Feb. 13, 2004.

"Protein Processing With Ultraviolent Laser; Osaka Univ. and Nikon: No Damage to Crystal," Business and Technology, Jan. 27, 2004.

A. Murakami, H. Kitano, H. Adachi, H. Muramatsu, K. Takano, Y. Mori, S. Owa, T. Sasaki (Osaka Univ. Crystal Design Project, Osaka Univ. Post Graduate Institute, Nikon Corporation), "Protein Crystal Processing Using Ultraviolet Laser," Digest of Technical Papers, Annual Meeting of the Crystal Society of Japan, Dec. 1-2, 2003.

Fumi Tsunesada, Hiroaki Adachi, Yoichiro Hosokawa, Hiroshi Masuhara, Masashi Yoshimura, Yusuke Mori and Takatomo Sasaki, Condensed femtosecond laser beam induced control of crystal nucleation Dai 50 Kai Oyo Butsurigaku Kankei Rengo Koenkai Koen Yokoshu, No. 3, Mar. 27, 2003, p. 1427.

Hiroaki Adachi, Masashi Yoshimura, Yusuke Mori and Takatomo Sasaki "Yuki Tanpakushitsu ni Okeru Atarashii Laser Oyo (Technique For Laser Processing of Protein Crystals)." Digest of Technical Papers, 24th Annual Meeting of the Laser Society of Japan, Jan. 29, 2004.

Hiroaki Adachi, Masashi Yoshimura, Yusuke Mori and Takatomo Sasaki (Department of Electrical Engineering, Osaka University), "New Laser Application on Organic and Protein Research," Digest of Technical Papers, 24th Annual Meeting of the Laser Society of Japan, Jan. 29-30, 2004.

Hiroaki Adachi, Yoichiro Hosokawa, Hiroshi Masuhara, Masashi Yoshimura, Yusuke Mori and Takatomo Sasaki, "Protein Crystallization Using Short Pulse Laser," The Review of Laser Engineering, Feb. 15, 2004, p. 84.

Hiroshi Kitano, Hiroaki Adachi, Atsutoshi Murakami, Hiroyoshi Matsumura, Kazufumi Takano, Tsuyoshi Inoue, Yusuke Mori, Soichi Owa and Takatomo Sasaki, "New Approach to Improve X-Ray Diffraction Pattern of Protein Crystal Using UV-Laser Ablative Processing," Japanese Journal of Applied Physics, vol. 43, No. 2B, 2004, pp. L297-L299, Feb. 6, 2004.

Hiroshi Kitano, Hiroaki Adachi, Atsutoshi Murakami, Hiroyoshi Matsumura, Kazufumi Takano, Tsuyoshi Inoue, Yusuke Mori, Soichi Owa and Takatomo Sasaki, "Protein Crystal Processing Using a Deep-UV Laser," Japapenese Journal of Applied Physics, vol. 43, No. 1A/B, 2004, pp. L73-L75, Dec. 26, 2003.

U.S. Appl. No. 10/594,375, filed Sep. 27, 2006.

* cited by examiner (a)   (b)

Fig. 10
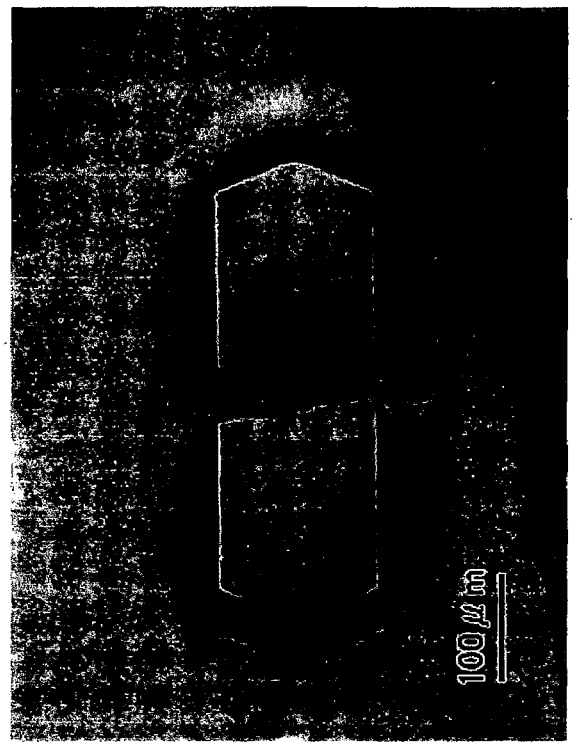
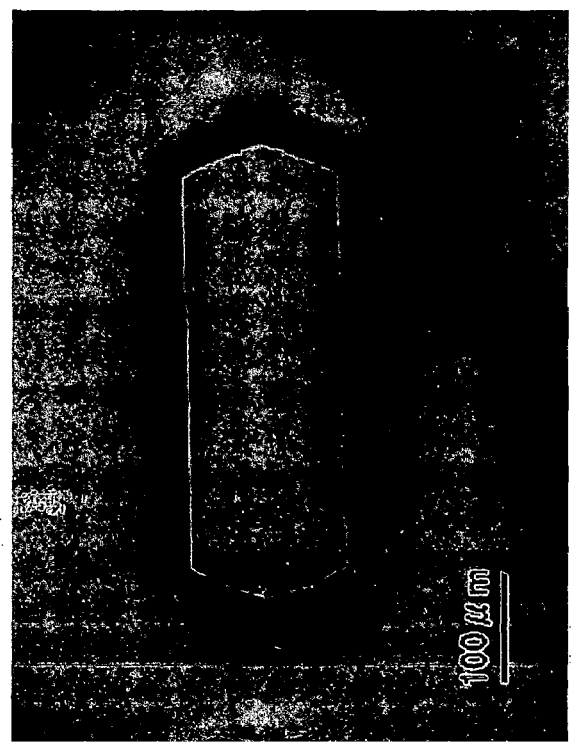

Fig. 12
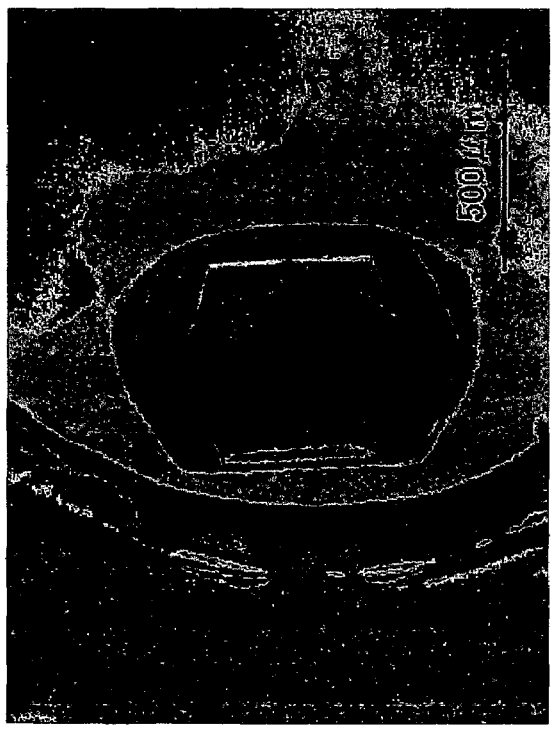

Fig. 14
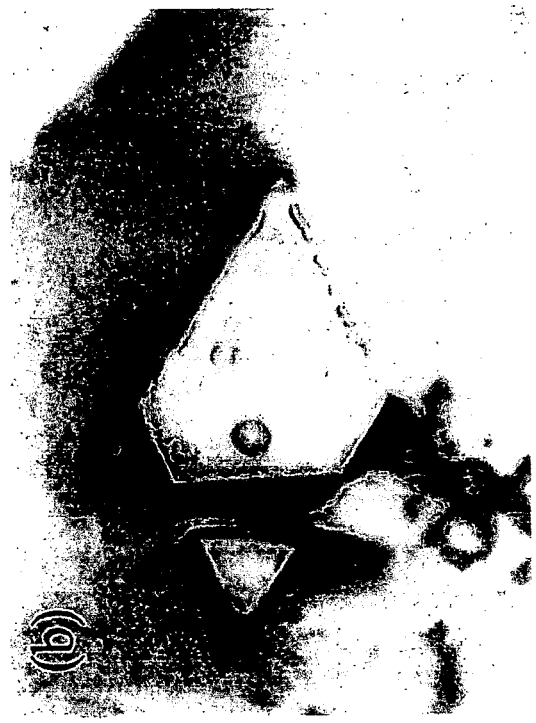
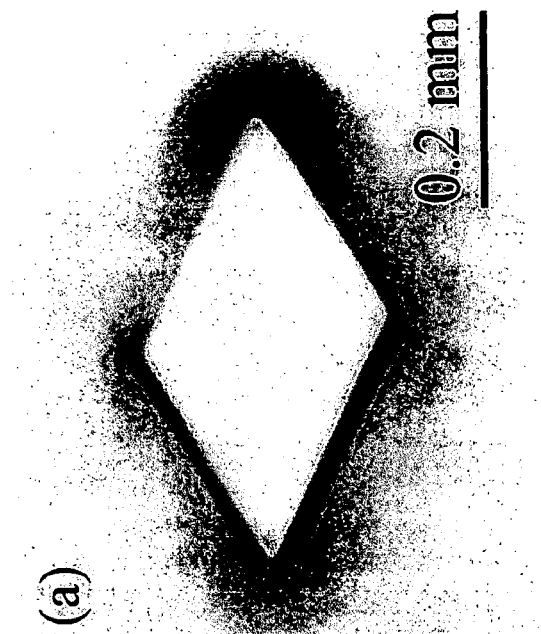

Fig. 21
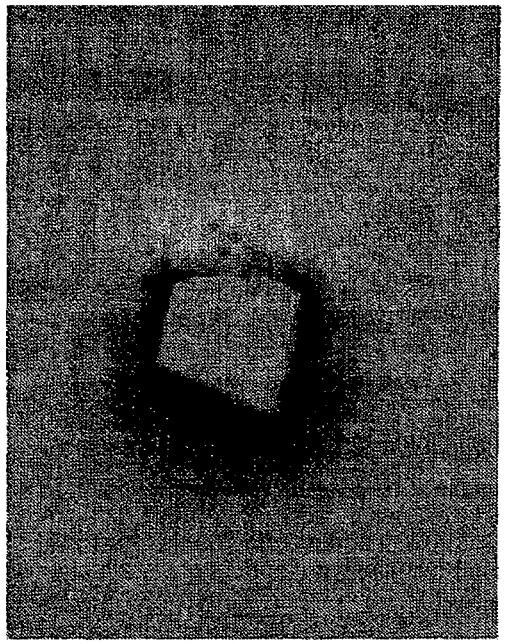
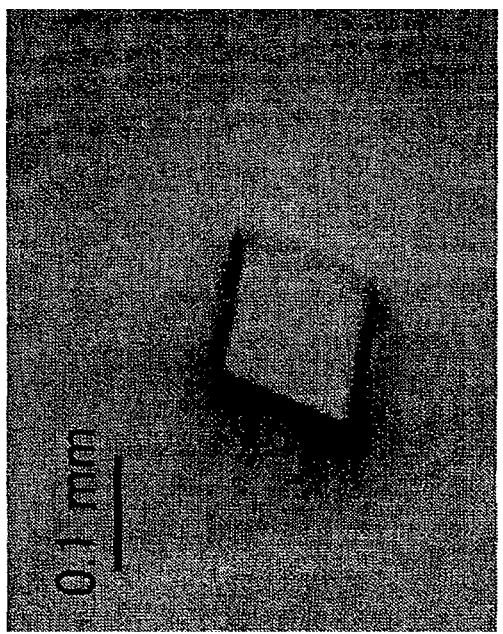

Fig. 22
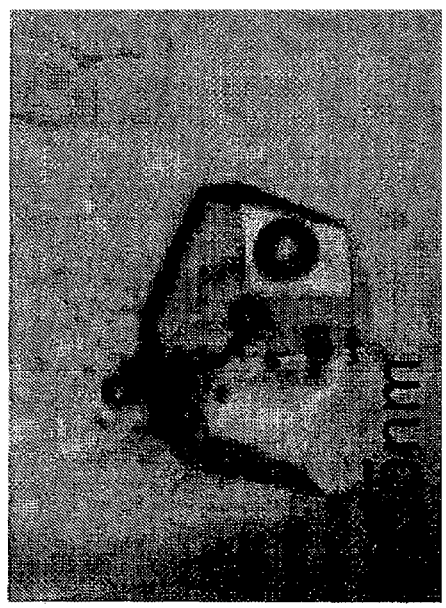
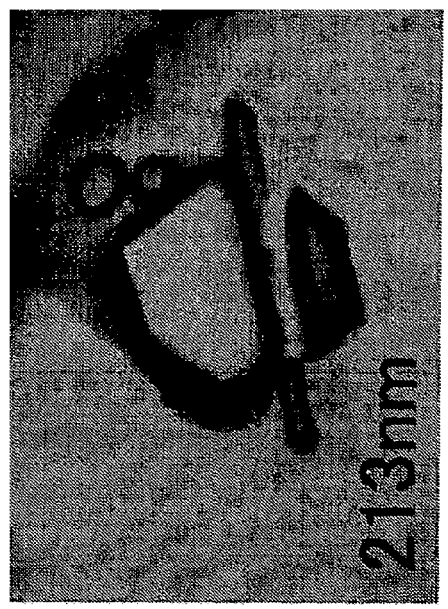
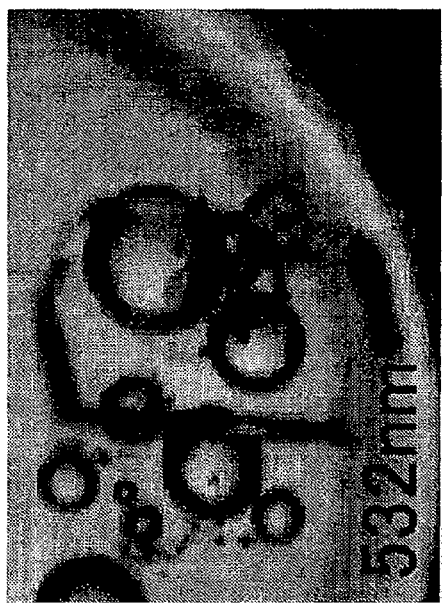
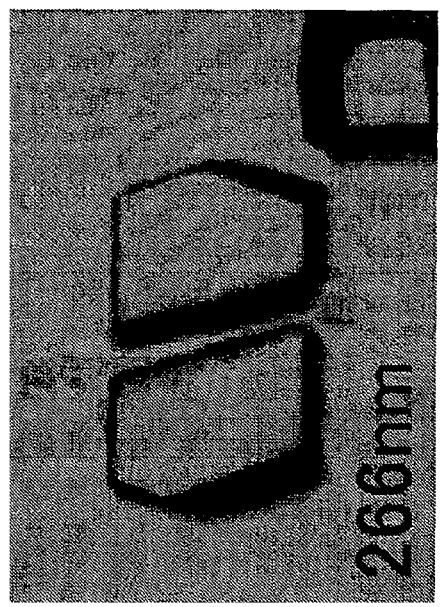

7,356,240 B2

PROCESSING METHOD OF POLYMER CRYSTAL, PROCESSING SYSTEM OF POLYMER CRYSTAL, AND OBSERVATION SYSTEM OF POLYMER CRYSTAL

This is a continuation from PCT International Application No. PCT/JP2004/013577 filed on Sep. 10, 2004, which is hereby incorporated by reference.

TECHNICAL FIELD

The present invention relates to a macromolecular crystal working method, and more particularly relates to a method and apparatus for working a macromolecular crystal into a desired shape by irradiating the macromolecular crystal with focused ultraviolet short-pulse laser light, and also to a macromolecular crystal observation device that incorporates such a macromolecular crystal working apparatus.

BACKGROUND ART

In recent years, post-genome research known as proteome has been actively pursued. Something that has attracted particular attention in this research is research that attempts to elucidate the three-dimensional structure of proteins; such research is called "structural genome science." Elucidation of the structures and functions of proteins is an important research field in the life sciences, and is directly connected to the treatment of diseases and the creation of drugs; accordingly, the analysis of detailed steric structures is indispensable. X-ray crystal structure analysis may be cited as one important means of such analysis; in order to apply X-ray crystal structure analysis, it is necessary to crystallize the macromolecular substances that are the object of analysis.

In the growth of macromolecular crystals, as in the growth of inorganic crystals and organic low-molecular crystals, crystals having a shape that reflects the molecular structure and growth conditions are grown. Furthermore, since crystallization conditions and growth conditions for obtaining good-quality single crystals have not been established for most macromolecular substances, control of crystallization and subsequent growth control are extremely difficult. Accordingly, there have been problems in terms of crystal quality, and problems such as polycrystallization due to the mutual adhesion of crystals that are deposited in close proximity to each other have frequently been encountered.

For example, in cases where X-ray crystal structure analysis is to be performed, single crystals that have the desired shape and that show good quality are required. Accordingly, the crystals are generally obtained by optimizing crystallization and growth conditions. As was described above, however, it is extremely difficult to obtain such crystals for macromolecular substances. Accordingly, there are cases in which portions with the size and shape or good crystal quality required for X-ray crystal structure analysis are extracted from the crystals obtained, or in which working such as the cutting of single crystals from polycrystals is performed.

However, since macromolecular crystals are far softer and more brittle than (for example) inorganic substances or organic low-molecular substances, damage such as cracking and splitting occurs in peripheral parts if a large impact is applied during working. Furthermore, such crystals are also sensitive to temperature variations; it is known that such crystals readily are denatured if heat is applied.

Thus, since macromolecular crystals are extremely difficult to handle, it is extremely difficult to use working techniques that have become widespread in inorganic crystals and other materials "as is" in macromolecular crystals, so that reliable crystal working techniques have not yet been established.

Currently used working methods for macromolecular crystals are working methods using blades, needles, or the like that require mechanical contact with the crystal. In such methods, working is performed manually under observation by means of a microscope or the like; these methods are used mainly to cut macromolecular crystals.

However, macromolecular crystals are mechanically brittle compared to general crystals, so that when working is performed by means of a blade or needle, there is a possibility that the cut surface will crumble as a result of the shear forces to which the cut surface is subjected. Accordingly, currently used macromolecular crystal working methods are methods in which many elements are left to chance, and the probability of success and reproducibility are low even in cases where working is performed by a person with professional skill. In the case of such methods, furthermore, although relatively simple working such as the cutting of crystals is possible, application is extremely difficult in cases where complicated and precise working is required.

DISCLOSURE OF THE INVENTION

The present invention was devised in light of such circumstances; it is an object of the present invention to provide a working method and working apparatus which make it possible to perform various types of working on macromolecular crystals securely and with little damage by means of a simple operation, and a macromolecular crystal observation device which incorporates this working apparatus, and which allows the quick observation of macromolecular crystals.

The first invention that is used in order to achieve the object described above is a macromolecular crystal working method, wherein a macromolecular crystal is worked by irradiation with ultraviolet short-pulse laser light.

Currently, laser light has become popular as a working tool. However, working by means of widely used carbon dioxide gas lasers (wavelength 10.6 μm), YAG lasers (wavelength 1.06 μm), and the like is thermal working, so that the material that is being worked undergoes a temperature elevation when irradiated with laser light. Furthermore, it is desirable that the laser light that irradiates the material being worked be pulsed light rather than continuous light. The reason for this is that laser working by means of continuous light is basically thermal working. Accordingly, in the case of macromolecular crystals in which thermal deformation must be avoided, working by means of such infrared lasers and visible-light lasers, and laser working by means of continuous light, are unsuitable.

Accordingly, the present inventors focused on ultraviolet short-pulse lasers. Specifically, since the wavelength of ultraviolet short-pulse laser light is short, such laser light has a high photon energy, so that working that directly breaks the chemical bonds of macromolecular crystals is possible. In the case of this working, it is possible to achieve smooth, high-precision working in which the effects of heat are far smaller than those seen in the case of working using carbon dioxide gas lasers or YAG lasers.

C—N bonds and C—C bonds are present in the principal chains of macromolecular substances. The bonding energy of C—N bonds is approximately 70 kcal/mol, and the bonding energy of C—C bonds is approximately 84 kJ/mol. In the case of ultraviolet short-pulse laser light with a wavelength of 300 nm, for example, the photon energy corresponds to approximately 95 kcal/mol; accordingly, these bonds can be broken by such laser light.

Working by means of such ultraviolet short-pulse laser light irradiation is basically working that breaks and volatilizes molecular bonds by means of photon energy; accordingly, shear forces do not act on the cleaved surfaces during working. As a result of this superior property, extremely brittle materials such as macromolecular crystals can be cut without crumbling, so that clean-cut surfaces can be obtained. Accordingly, the present invention is especially effective in the working of macromolecular crystals which are such that the worked surface is damaged in cases where mechanical working is performed.

The second invention that is used in order to achieve the object described above is the first invention, wherein the macromolecular crystal is at least one crystal selected from a set consisting of resins, proteins, sugars, lipids and nucleic acids.

Macromolecular crystals consisting of such materials are especially brittle, and tend to be completely destroyed if subjected to even a small shear force. Accordingly, these are materials in which the application of the first invention is especially effective.

The third invention that is used in order to achieve the object described above is the first invention or second invention, wherein the form of working is working that strips the macromolecular crystal from a substance to which this macromolecular crystal is adhering.

When the interface between a macromolecular crystal and a substance to which this macromolecular crystal is adhering is irradiated with ultraviolet short-pulse laser light, laser ablation occurs in the area where the laser light is focused, so that a local pressure elevation occurs at this interface. In particular, in cases where a macromolecular crystal contains water, or in cases where water is adhering to a macromolecular crystal, gas bubbles are generated in the area of focus, so that a pressure elevation caused by volumetric expansion occurs. As a result of this pressure elevation, the macromolecular crystal is stripped from the substance to which this crystal is adhering.

If an attempt is made to strip a macromolecular crystal by means that require mechanical contact with the macromolecular crystal, the crystal is often damaged. However, stripping by means of the present invention is accomplished by applying a slight local impact; accordingly, this stripping can be accomplished without causing any great damage to the macromolecular crystal. Furthermore, even in cases where physical contact is difficult, stripping can be accomplished in a non-contact manner.

In addition, if an attempt is made to strip a macromolecular crystal mechanically, there is a possibility that the area around the macromolecular crystal will also be damaged. In the case of the present invention, however, irradiation with laser light can be accomplished with high positional precision; accordingly, the stripping of extremely fine crystals, for example, can also be accomplished easily. Moreover, even in cases where adhering substances other than the object of stripping are present in the area around the object of stripping, it is possible to securely strip only the object of stripping.

The fourth invention that is used in order to achieve the object described above is any of the first through third inventions, wherein the form of working is working that is performed from the surface of the macromolecular crystal.

Working of the interior of the object of working may be cited as one form of working using a pulsed laser. It is known that such working can be accomplished by using pulsed light on the femtosecond order (less than one picosecond) in which the pulse peak power is extremely high. When femtosecond pulsed light is focused on the interior of the object of working, even if the object of working is transparent (i.e., does not have linear absorption) at the wavelength of the irradiating light, energy is absorbed at the focal point, so that the material is subjected to working. However, in cases where an extremely brittle material such as a macromolecular crystal is the object of working, the object of working may be damaged by impact during the working of the interior. Accordingly, it is desirable that working be performed only from the surface side. For instance, conceivable forms of working from the surface include cutting, partial removal, boring of holes, modification, pulverization and the stripping described above. In the present specification and claims, "working" refers to working that includes such examples.

The fifth invention that is used in order to achieve the object described above is any of the first through fourth inventions, wherein the wavelength of the ultraviolet short-pulse laser light is 400 nm or less.

C—N bonds are commonly present in macromolecular crystals; accordingly, in order to securely break the C—N bonds in such cases, it is desirable that the wavelength of the irradiating ultraviolet short-pulse laser light be 400 nm or less. Furthermore, if the secure breaking of C—C bonds is taken into consideration, it is desirable that this wavelength be 340 nm or less. In terms of energy, there is no particular need to restrict the lower limit of the wavelength of the ultraviolet short-pulse laser light. However, if this wavelength is less than 190 nm, absorption by oxygen in the atmosphere is increased; accordingly, it is desirable that this wavelength be 190 nm or greater. Currently, furthermore, easily obtainable optical elements do not allow the passage of light with a wavelength of less than 150 nm; accordingly, it is desirable to use ultraviolet short-pulse laser light with a wavelength of 150 nm or greater.

The sixth invention that is used in order to achieve the object described above is any of the first through fifth inventions, wherein the energy density per pulse of the ultraviolet short-pulse laser light is 1 mJ/cm$^2$ or greater.

In the working process using ultraviolet short-pulse laser light, the working characteristics are greatly influenced by the energy density per pulse (fluence) of the irradiating ultraviolet short-pulse laser light. Generally, the amount of working per pulse of the irradiating ultraviolet short-pulse laser light (i.e., the working rate) does not show linearity with respect to the fluence. In cases where the fluence is too small, even if the chemical bonds are broken, the subsequent volatilization is insufficient, so that working cannot be performed. Specifically, a fluence that is equal to or greater than a certain threshold value is necessary in order to start working. In the case of a fluence that is equal to or greater than this threshold value, the working rate increases with an increase in the fluence. Accordingly, the fluence of the irradiating ultraviolet short-pulse laser light must be appropriately adjusted in order to obtain good working characteristics.

The appropriate fluence mentioned above depends on the absorption coefficient of the material being worked with respect to the irradiating light. As the absorption coefficient increases, more photons are absorbed per unit volume, so that the chemical bonds are broken more efficiently. Consequently, the value of the fluence constituting the threshold value of workability is reduced. The absorption coefficients of macromolecular substances vary greatly according to the wavelength in the ultraviolet region; therefore, the appropriate fluence differs according to the wavelength of the irradiating light. In the wavelength region of 400 nm or less, a fluence of 1 mJ/cm$^2$ or greater can be employed. By performing ultraviolet short-pulse laser irradiation at this appropriate fluence, it is possible to cause the effects of working to extend over a region with a depth of 1 nm or greater from the surface of the crystal for each pulse of ultraviolet short-pulse laser light.

The seventh invention that is used in order to achieve the object described above is a macromolecular crystal working apparatus for working macromolecular crystals, wherein this macromolecular crystal working apparatus has an ultraviolet short-pulse laser, an optical system which conducts the ultraviolet short-pulse laser light emitted from this ultraviolet short-pulse laser to a macromolecular crystal constituting the object of working, and which focuses this laser light on the location of this macromolecular crystal that is being worked, and a mechanism that varies the relative positions of the optical system and the macromolecular crystal.

In this invention, by using a mechanism that varies the relative positions of the optical system and the macromolecular crystal, it is possible to perform irradiation so that the focal position of the ultraviolet short-pulse laser light is at the location on the macromolecular crystal where working is being performed, and thus to work macromolecular crystals into specified shapes while varying the relative positions of the optical system and macromolecular crystal.

The eighth invention that is used in order to achieve the object described above is the seventh invention, wherein this invention has an observation device that observes the position where the ultraviolet short-pulse laser light is focused simultaneously with the macromolecular crystal, or a measuring device that measures this position simultaneously with the macromolecular crystal.

In this invention, the position where the ultraviolet short-pulse laser light is focused can be observed or measured simultaneously with the macromolecular crystal; accordingly, the location on the macromolecular crystal that is being irradiated with the ultraviolet short-pulse laser light can be observed or measured; as a result, desired working can easily be performed.

The ninth invention that is used in order to achieve the object described above is the eighth invention, wherein the observation device or measuring device is an optical observation device or optical measuring device that uses visible light, this observation device or measuring device is in a mechanically fixed relationship with the optical system, the reference point of the observation device or measuring device coincides with the position where the ultraviolet short-pulse laser light is focused, and this invention has the function of indirectly observing or measuring the position where the ultraviolet short-pulse laser light is focused by observing or measuring the position of the reference point of the observation device or measuring device.

In cases where the irradiating laser light is ultraviolet short-pulse laser light, the irradiation position cannot be observed or measured unless a special light transducer or photodetector is used. Accordingly, the point at which the laser light is focused on the macromolecular crystal cannot be ascertained. In the present invention, therefore, a reference point (ordinarily three-dimensional) is provided on the side of the observation device or measuring device, and the system is devised so that the ultraviolet short-pulse laser light is focused on this reference point, and so that this reference point is observed simultaneously with the macromolecular crystal. Accordingly, the ultraviolet short-pulse laser light irradiation position on the macromolecular crystal can be ascertained by means of visible light. In the reference position, for example, scale lines can be provided in two dimensions perpendicular to the optical axis of the observation device or measuring device to form a reference position, and the focal position can be taken as the reference position in the direction of the optical axis.

The tenth invention that is used in order to achieve the object described above is a macromolecular crystal observation device, wherein the macromolecular crystal working apparatus of any of the seventh through ninth inventions is incorporated into this observation device.

There may be cases in which it is necessary to remove the macromolecular crystal from the solution in order to work this crystal; in such cases, the macromolecular crystal following working may undergo some denaturation unless this crystal is quickly observed. In this invention, the macromolecular crystal working apparatus of the present invention is incorporated into the macromolecular crystal observation means, so that observation can immediately be performed when working is completed.

The eleventh invention that is used in order to achieve the object described above is the tenth invention, wherein the observation device is an X-ray diffraction device.

X-ray diffraction devices are one of the observation devices most commonly used for the structural analysis of crystals. In addition, the macromolecular crystal working apparatus of the present invention is incorporated, so that observation can be immediately performed when working is completed, and the structural analysis of crystals can be accurately performed.

BRIEF DESCRIPTION OF THE DRAWINGS

FIG. 10 is a diagram showing a photograph of a state in which a section is cut across the macromolecular single crystal in a first embodiment of the present invention.

FIG. 11 is a diagram showing the X-ray diffraction pattern of the cut macromolecular single crystal in a first embodiment of the present invention.

FIG. 12 is a diagram showing a photograph of a state in which a hole is bored in the macromolecular crystal in a second embodiment of the present invention.

FIG. 14 is a diagram showing a photograph of the states before and after the cutting of the macromolecular crystal in a fourth embodiment of the present invention.

FIG. 16 is a diagram showing a photograph of the states before and after the removal of a portion of the macromolecular crystal in a sixth embodiment of the present invention.

FIG. 21 is a diagram showing an example in which a portion of the crystal is removed by ablation using an AcrB crystal (which is a membrane protein crystal) as the material that is being worked.

FIG. 22 is a diagram showing the working results in the case of irradiation with the second harmonic (fluence 60 J/cm$^2$), third harmonic (fluence 7 J/cm$^2$), fourth harmonic (fluence 1 J/cm$^2$) and fifth harmonic (fluence 0.5 J/cm$^2$) of the Nd:YAG laser light.

BEST MODE FOR CARRYING OUT THE INVENTION

Figure 1:
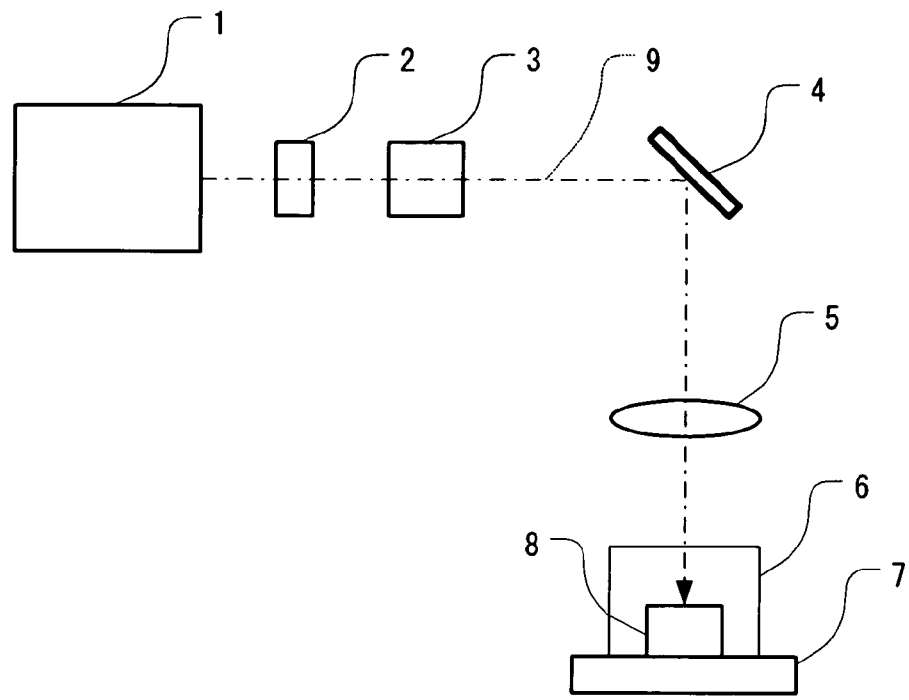
FIG. 1 is a schematic diagram of a macromolecular crystal working apparatus constituting one working configuration of the present invention.

Working configurations of the present invention will be described below with reference to the figures. FIG. 1 is a schematic diagram of a macromolecular crystal working apparatus constituting one working configuration of the present invention. The ultraviolet short-pulse laser light 9 that is emitted from an ultraviolet short-pulse laser light source 1 is focused on and caused to irradiate a macromolecular crystal 8 that is placed in a sample container 6 via a shutter 2, intensity adjusting element 3, irradiation position control mechanism 4 and focusing optical system 5. The sample container 6 is mounted on a stage 7, and can be moved in the three directions of the x axis, y axis and z axis in an x-y-z orthogonal coordinate system, with the direction of the optical axis taken as the z axis. Furthermore, this sample container 6 can be rotated about the z axis. Working of the macromolecular crystal is performed by the ultraviolet short-pulse laser light that is focused on and caused to irradiate the surface of the macromolecular crystal 8.

As was described above, macromolecular substances include substances that have C—N bonds, and in order to break such C—N bonds in a macromolecule, it is required that the wavelength of the laser light used be 400 nm or less. On the other hand, the various types of optical elements that are required for irradiation with laser light do not efficiently pass light that has a wavelength of less than 150 nm. Consequently, the use of laser light with a wavelength of less than 150 nm is undesirable. Accordingly, the desirable wavelength range of the irradiating laser light is 150 nm to 400 nm. Furthermore, if the secure breaking of C—C bonds is taken into consideration, it is desirable that the wavelength be 340 nm or less. On the other hand, if the wavelength of the laser light is less than 190 nm, there is absorption by oxygen in the atmosphere; accordingly, the following problem arises: namely, propagation of the laser light in air becomes difficult. In other words, an even more desirable wavelength of the ultraviolet short-pulse laser light is in the range of 190 nm to 340 nm.

Figure 2:
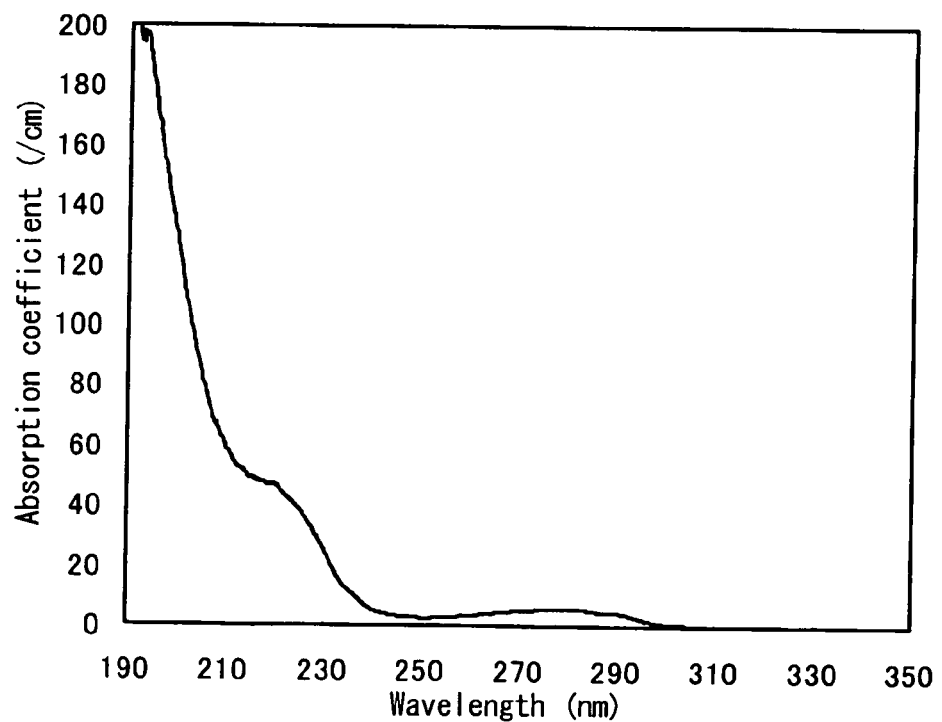
FIG. 2 is a diagram showing the absorption coefficients in the ultraviolet region of an aqueous solution of hen-egg white lysozyme (1 mg/ml).

The absorption of light by macromolecules will be described using proteins as an example. FIG. 2 shows the absorption coefficients in the ultraviolet region of an aqueous solution (1 mg/ml) of hen-egg white lysozyme, which is a typical protein. At 300 nm or less, the absorption begins to increase. First, there is a peak in the vicinity of 270 nm to 280 nm; then, after the absorption drops slightly in the vicinity of 250 nm, the absorption shows an abrupt increase as the wavelength becomes shorter.

In the wavelength range of 300 nm or less, the irradiating light has a great effect on bonds in the macromolecule, and is efficiently absorbed by the surface layer without invading the interior of the crystal. Accordingly, decomposition proceeds only in the surface portions that are irradiated by the light, so that working can be performed with little effect on surrounding areas. Specifically, an even more desirable ultraviolet laser wavelength in the working of proteins is 300 nm or less.

The wavelength of ultraviolet short-pulse laser light is shorter than the absorption edge on the short-wavelength side of the macromolecular crystal constituting the object of working, and working from the surface of the macromolecular crystal can be securely achieved by using ultraviolet short-pulse laser light for which the macromolecular crystal shows linear absorption. In the absorption spectra of macromolecular crystals, the shape differs according to the object, so that the absorption-edge wavelength cannot be definitively determined. However, it is desirable that the wavelength of the laser light be shorter than the absorption edge on the short wavelength side of the macromolecular crystal.

$F_2$ lasers, ArF excimer lasers, KrF excimer lasers, XeCl excimer lasers, XeF excimer lasers, and the like can be cited as examples of gas lasers that can be used. Furthermore, as examples of the use of higher harmonics of laser light, the third harmonic, fourth harmonic, fifth harmonic and sixth harmonic of Nd:YAG lasers, the third harmonic, fourth harmonic, fifth harmonic and sixth harmonic of Nd:YVO$_4$ lasers, the second harmonic, third harmonic, fourth harmonic and fifth harmonic of Ti:S lasers, the fourth harmonic, fifth harmonic, sixth harmonic, seventh harmonic and eighth harmonic of erbium-doped fiber lasers, the third harmonic, fourth harmonic, fifth harmonic and sixth harmonic of ytterbium-doped fiber lasers, the second harmonic and third harmonic of Ar ion lasers, and the like can also be used.

These harmonic generation circuits are universally known; one example will be described with reference to FIG. 3. This is a solid-state laser apparatus which generates light with a wavelength of 193 nm; in this apparatus, light from a semiconductor laser with a wavelength of 1547 nm is amplified by a fiber amplifier, semiconductor amplifier, or the like, and this amplified fundamental wave of 1547 nm is converted in wavelength to the eighth harmonic by a wavelength-converting optical system to produce light with a wavelength of 193 nm. The semiconductor laser and light amplifying parts such as the fiber amplifier will not be described here; however, these parts are described, for example, in Japanese Patent Application Kokai No. 2000-200747, and are therefore publicly known.

Figure 3:
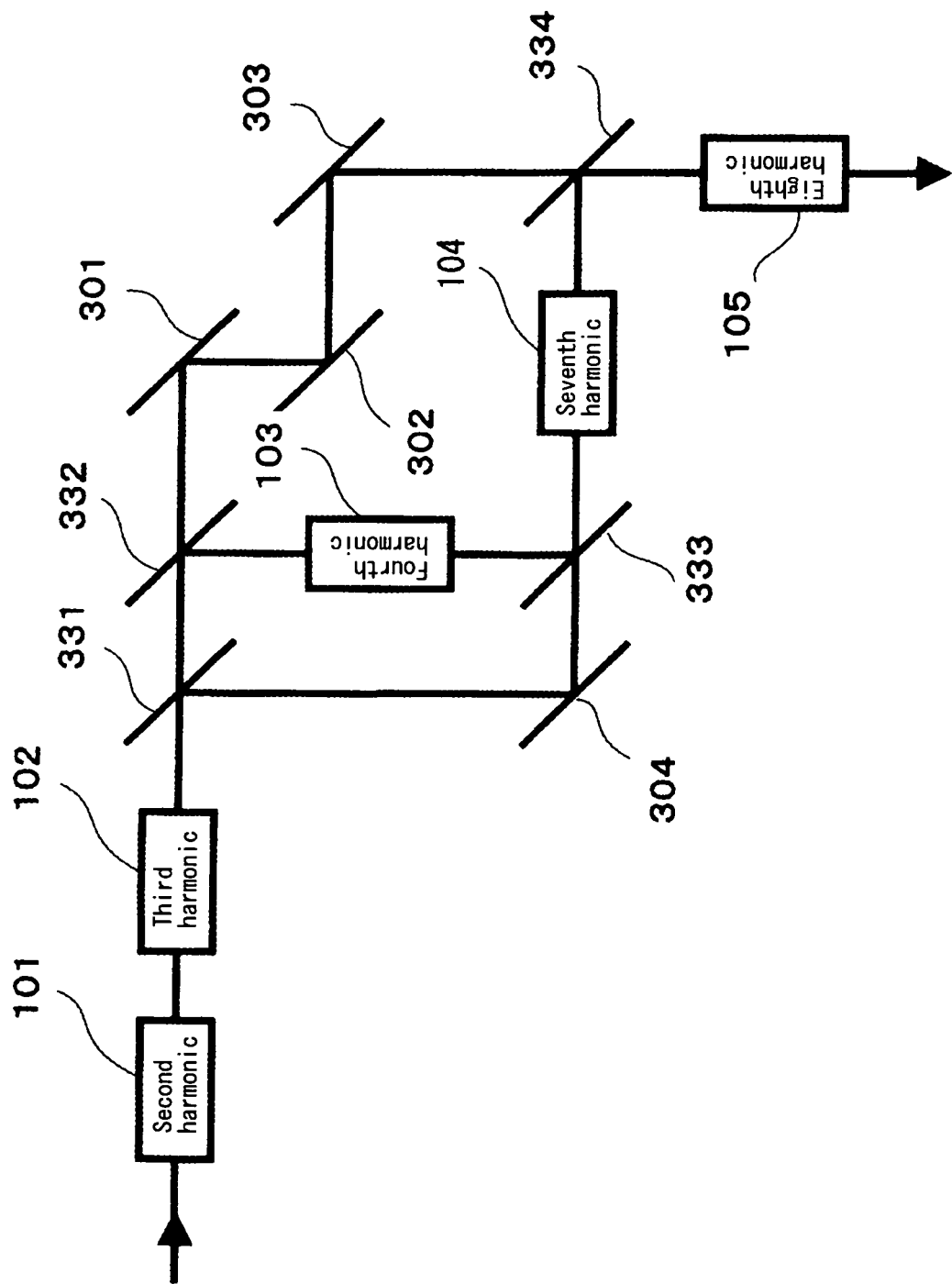
FIG. 3 is a diagram showing an example of the harmonic generation circuit.

In FIG. 3, the fundamental wave amplified by the fiber amplifier or the like is incident on a wavelength converting crystal, so that a portion of the fundamental wave is converted into the second harmonic. Examples of the wavelength converting crystal 101 include LBO ($LiB_3O_5$), PPLN (periodically poled $LiNbO_3$), PPKTP (periodically poled $KTiOPO_4$), and the like.

The fundamental wave and second harmonic that are emitted from the wavelength converting crystal 101 are incident on a wavelength converting crystal 102, so that portions of the fundamental wave and second harmonic are converted to the third harmonic. Examples of the wavelength converting crystal 102 include LBO, PPLN, PPKTP, and the like.

The light of the fundamental wave, second harmonic and third harmonic emitted from the wavelength converting crystal 102 is incident on a dichroic mirror 331. The fundamental wave and second harmonic pass through, while the third harmonic is reflected. The second harmonic that passes through the dichroic mirror 331 is reflected by a dichroic mirror 332, and is incident on a wavelength converting crystal 103, so that a portion of the second harmonic is converted to the fourth harmonic. Examples of the wavelength converting crystal 103 include LBO, PPLN, PPKTP, and the like.

The fourth harmonic that is emitted from the wavelength converting crystal 103 is reflected by a dichroic mirror 333, so that this harmonic is substantially coaxial with the third harmonic that has been reflected by the dichroic mirror 331 and mirror 304 and passed through the dichroic mirror 333. This light is then incident on a wavelength converting crystal 104, so that portions of the third harmonic and fourth harmonic are converted to the seventh harmonic. Examples of the wavelength converting crystal 104 include BBO ($\beta$-$BaB_2O_4$), and the like.

The seventh harmonic that is emitted from the wavelength converting crystal 104 is reflected by a dichroic mirror 334, so that this harmonic is substantially coaxial with the fundamental wave that has passed through the dichroic mirrors 331 and 332, has been reflected by the mirrors 301, 302 and 303, and has passed through the dichroic mirror 334. This light is then incident on a wavelength converting crystal 105. Then, portions of the fundamental wave and the seventh harmonic are converted to light having a wavelength of 193 nm, which is the eighth harmonic. Examples of the wavelength converting crystal 105 include LBO, CLBO ($CsLiB_6O_{10}$), BBO, and the like. However, the crystal used is not limited to these.

Furthermore, in the optical system shown in FIG. 3, the depiction of lenses and wavelength plates is omitted; in the actual optical system, however, these parts are disposed in desired locations. If a portion of this optical system is used, the second harmonic, third harmonic, fourth harmonic and seventh harmonic can also be formed. Circuits that form the fifth harmonic and sixth harmonic are separate; however, since these circuits are publicly known, a description is omitted. Moreover, the optical system shown in FIG. 3 is taken as a part of the ultraviolet short-pulse laser light source 1 shown in FIG. 1.

It is desirable that the ultraviolet short-pulse laser light that irradiates the material being worked be pulsed light rather than continuous light. Laser working by means of continuous light is basically thermal working; for the reasons described above, this is not suitable for the working of macromolecular crystals. Furthermore, it is desirable that the pulse temporal width of the pulsed light be short; in quantitative terms, it is desirable that the full width at half maximum be 100 ns or less. If this value exceeds 100 ns, the deleterious effects of heat generation cannot be ignored even in working by means of ultraviolet short-pulse laser light. A pulse width of 10 fs to 10 nm is even more desirable; a so-called nanosecond pulsed laser, picosecond pulsed laser or femtosecond pulsed laser can be used for this.

In the process of working by means of ultraviolet short-pulse laser light, the working characteristics are greatly influenced by the energy density (fluence) per pulse of the irradiating ultraviolet short-pulse laser light. Generally, the amount of working per pulse of the ultraviolet short-pulse laser light (i.e., the working rate) does not show a linear response to the fluence. In cases where the fluence is too small, even if the chemical bonds are cut, the subsequent volatilization is insufficient, so that working cannot be performed. Specifically, a fluence that is equal to or greater than a certain threshold value is required in order to start working by means of ultraviolet short-pulse laser light. At fluence values that are equal to or greater than this threshold value, the working rate increases with an increase in the fluence. Accordingly, in order to obtain favorable working characteristics, the fluence of the irradiating ultraviolet short-pulse laser light must be appropriately adjusted.

The appropriate fluence mentioned above depends on the absorption coefficient of the material that is being worked with respect to the irradiating light. As the absorption coefficient increases, more photons are absorbed per unit volume, so that chemical bonds are cut more efficiently. Accordingly, the value of the fluence that constitutes the working threshold value decreases. As is shown in one example illustrated in FIG. 2, the absorption coefficients of macromolecules vary greatly according to the wavelength in the ultraviolet region; therefore, the appropriate fluence varies according to the wavelength of the irradiating light.

Specifically, a desirable fluence in the wavelength range of 150 nm or greater but less than 210 nm is 1 $mJ/cm^2$ or greater, a desirable fluence in the wavelength range of 210 nm or greater but less than 240 nm is 10 $mJ/cm^2$ or greater, a desirable fluence in the wavelength range of 240 nm or greater but less than 300 nm is 100 $mJ/cm^2$ or greater, and a desirable fluence in the wavelength range of 300 nm to 400 nm is 1 $J/cm^2$ or greater.

By performing ultraviolet short-pulse laser light irradiation at the appropriate fluence described above, it is possible to cause the effects of working to extend over a region having a depth of 1 nm or greater from the crystal surface (per pulse of ultraviolet short-pulse laser light).

Irradiation with ultraviolet short-pulse laser light may be performed in a single emission, or a plurality of emissions may be repeated. The working speed in cases where irradiation with a plurality of pulses is performed varies according to the pulse repetition frequency. If the repetition frequency is too small, a high working speed cannot be obtained. On the other hand, if the repetition frequency is too large, there may be cases in which deleterious effects arise due to heat generation. Specifically, the pulse repetition frequency can be freely set within a range in which the generation of heat causes no problems. Since the effects of heat generation vary according to the wavelength and pulse width of the laser light, the scanning of the laser beam, and the like, the appropriate pulse repetition frequency cannot be definitively determined. However, for example, a pulse repetition frequency of 100 MHz or less can be used. Furthermore, from the standpoint of achieving both a favorable working speed and favorable working characteristics, a more desirable pulse repetition frequency range is 10 Hz to 1 MHz. In this case, when the same location on the material being worked is irradiated with a plurality of pulses of the ultraviolet short-pulse laser light, the time interval of the light pulses irradiating the same location is 1 µs or longer. Furthermore, the pulse repetition frequency can also be varied appropriately during working.

In cases where irradiation is performed by repeating a plurality of laser light pulses, the number of irradiating pulses can be freely set in accordance with the purpose of working. Accordingly, there are no particular restrictions on the total irradiation time.

The number of irradiating pulses applied to the macromolecular crystal can be controlled by means of the shutter 2 that is disposed between the ultraviolet short-pulse laser light source 1 and the macromolecular crystal 8. More desirable working conditions can be achieved by irradiating the macromolecular crystal with only the number of light pulses required for the respective purposes of working.

The intensity of the irradiating light applied to the macromolecular crystal can be adjusted by means of the intensity adjusting element 3. A combination of a polarizer and a half-wavelength plate or the like can be used as this means. In cases where the working of an area larger than the diameter of the laser spot is performed by irradiation with a plurality of light pulses, working is performed while causing the laser spot position to move relative to the macromolecular crystal. The first method used in this case is a method in which the stage 7 is appropriately moved. The second method is a method in which the laser spot position on the macromolecular crystal 8 is scanned in the direction perpendicular to the optical axis using the irradiation position control mechanism 4. The irradiation position control mechanism 4 may be a galvano-mirror, polygonal mirror, acousto-optical deflector, or the like. It would also be possible to move both the laser spot position and the position of the macromolecular crystal 8 by using both of the two methods described above simultaneously. In cases where working is performed while moving the laser spot position relative to the macromolecular crystal 8, the relative speed can be appropriately set in accordance with the repetition frequency of the irradiating light, the absorption coefficient of the material that is being worked, and the like.

In cases where the working described above is performed while causing the macromolecular crystal to rotate relative to the ultraviolet short-pulse laser light, working can be performed while rotating the macromolecular crystal by rotating the stage 7. The desirable relative rotational speed depends on the repetition frequency of the irradiating light, the absorption coefficient of the macromolecular crystal, and the like.

The ultraviolet short-pulse laser light 9 can be focused on the macromolecular crystal in spot form or linear form by using an image focusing optical system. The focusing optical system 5 that is used may consist of ultraviolet reflective mirrors, lenses and prisms that can efficiently transmit ultraviolet light or the like.

The ultraviolet short-pulse laser light 9 can also be propagated using optical fibers. It is necessary that the optical fibers used consist of materials that efficiently transmit ultraviolet light, and that these optical fibers have a strength which is such that the fibers are not destroyed by the light that is introduced. The shape of the optical fibers may also be hollow. The output light from the optical fibers may irradiate the material that is being worked directly, or may irradiate the material that is being worked after being focused by a lens or the like.

The form in which the laser light is focused on the macromolecular crystal can be appropriately altered in accordance with the type and shape of the material being worked, and the purpose of working. Generally, the size of the macromolecular crystal that constitutes the object of working is about 1 cm (cubic) or less; accordingly, in cases where the light is focused in spot form, the laser spot diameter on the material being worked is preferably 1 mm or less. In cases where the light is focused in linear form, the long diameter of the laser spot is 1 cm or less, and the short diameter is 1 mm or less.

There may be cases in which the macromolecule constituting the material being worked contains water in the crystal. In such cases, in order to prevent denaturation caused by drying or damage to the crystal, a state in which the crystal is disposed in a crystal growth solution or preservative solution, a state in which the crystal is disposed in a sealed vessel, or a refrigerated state, can be used as the desirable crystal state during working.

Figure 4:
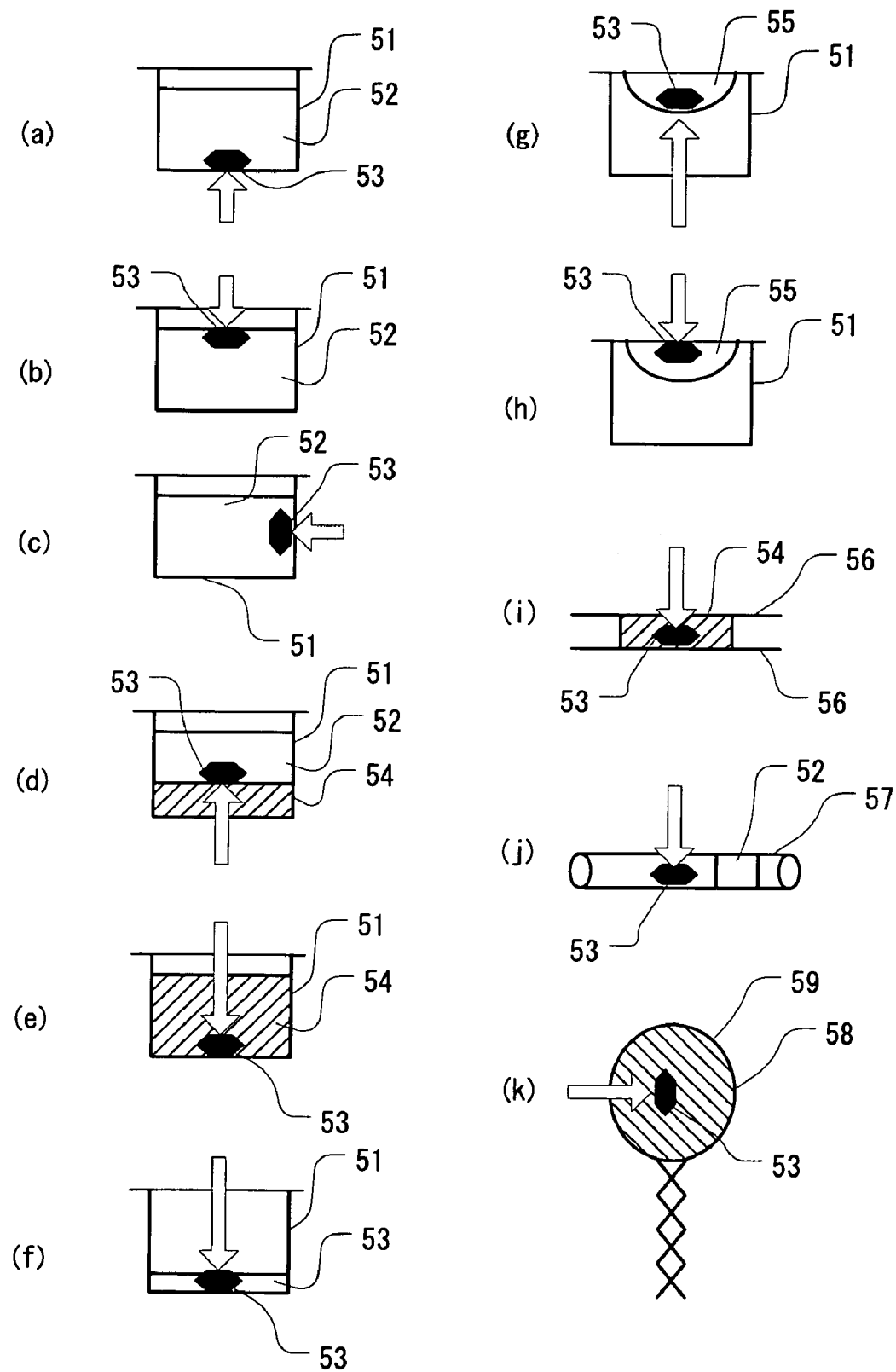
FIG. 4 is a diagram showing an example of the conditions under which the macromolecular crystal object of working is worked.

FIG. 4 shows an example of the state in which the macromolecular crystal object of working is worked. In FIG. 4, 51 indicates a sample container, 52 indicates an ultraviolet impermeable solution, 53 indicates the object of working (macromolecular crystal), 54 indicates an ultraviolet permeable solution, 55 indicates a solution, 56 indicates plates, 57 indicates a capillary, 58 indicates a loop, and 59 indicates a solution film. Furthermore, the arrows indicate ultraviolet light.

Generally, the macromolecular crystal is formed from a sample solution (mother liquor) that constitutes the source of the crystal, and a crystal is grown in this sample solution. Generally, however, the sample solution does not transmit ultraviolet short-pulse laser light, so that the macromolecular crystal cannot be irradiated with ultraviolet short-pulse laser light via the sample solution. Accordingly, some type of device is necessary for working by irradiation. Furthermore, in (a) through (k) below, the material of the sample container has a high transmittance for ultraviolet short-pulse laser light, and the surfaces of the sample container are designed to efficiently transmit ultraviolet short-pulse laser light.

(a) shows a case in which the grown macromolecular crystal is heavier than the sample solution, so that this crystal sinks to the bottom surface of the sample container. In this case, working is performed by irradiating the macromolecular crystal with ultraviolet short-pulse laser light via the sample container from the underside of the sample container. (b) shows a case in which the grown crystal is lighter than the sample solution, or floats to the surface of the sample solution as a result of the effects of surface tension. In this case, working is performed by directly irradiating the macromolecular crystal with ultraviolet short-pulse laser light from the upper side of the sample container. (c) shows a case in which the grown crystal adheres to the side surface of the sample container; in this case, working is performed by irradiating the macromolecular crystal with ultraviolet short-pulse laser light via the sample container from the side surface of the sample container.

In (a) through (c), ultraviolet light is not transmitted through the solution; accordingly, in such cases, the system is devised so that the ultraviolet light does not pass through the solution.

In the case of (d), a liquid that has a larger specific gravity than the sample solution and that transmits ultraviolet short-pulse laser light is added to the lower layer of the sample solution, and a crystal is grown, or a portion of the sample solution is replaced by a liquid that has a larger specific gravity than the sample solution and that transmits ultraviolet short-pulse laser light following the growth of the crystal, and working is performed by irradiating the macromolecular crystal floating at the boundary between the two liquids with ultraviolet short-pulse laser light via the sample container and the liquid that transmits ultraviolet short-pulse laser light. In the case of (e), the sample solution is completely replaced by a liquid that transmits ultraviolet short-pulse laser light (a liquid with a lighter specific gravity than the sample solution is desirable), the macromolecular crystal is thus caused to sink so that this crystal is positioned on the bottom surface of the sample container, and working is performed by irradiating the macromolecular crystal with ultraviolet short-pulse laser light via the sample container. In the case of (f), the sample solution is removed to such an extent that the surface of the macromolecular crystal is exposed, and working is performed by irradiating the surface of the macromolecular crystal with ultraviolet short-pulse laser light directly from above.

The macromolecular crystal growth methods used in cases where these working methods of (a) through (f) are used are mainly the sitting drop method and the batch method.

On the other hand, the working methods shown in (g) and (h) are working methods for macromolecular crystals grown by the hanging drop method. In the case of (g), working is performed by irradiating the crystal held at the liquid surface by surface tension with ultraviolet short-pulse laser light from below, and in the case of (h), working is performed by irradiating the crystal adhering to the sample container with ultraviolet short-pulse laser light from above.

(i) indicates a method in which a macromolecular crystal grown by the sandwich method is worked. Here, working is performed by irradiating the macromolecular crystal between the plates with ultraviolet short-pulse laser light via one of the plates and sample solution. Since the thickness of the sample solution is not large, only a slight amount of the ultraviolet short-pulse laser light is absorbed; accordingly, working can be performed.

(j) indicates a method in which the sample solution and macromolecular crystal are accommodated inside a capillary, the sample solution and macromolecular crystal are separated inside the capillary, and working is performed by irradiating the macromolecular crystal with ultraviolet short-pulse laser light via the capillary. (k) indicates a method in which the sample solution and macromolecular crystal are scooped up with a loop, so that the sample solution is formed into a thin film by surface tension, and working is then performed by directly irradiating the macromolecular crystal with ultraviolet short-pulse laser light.

Figure 5:
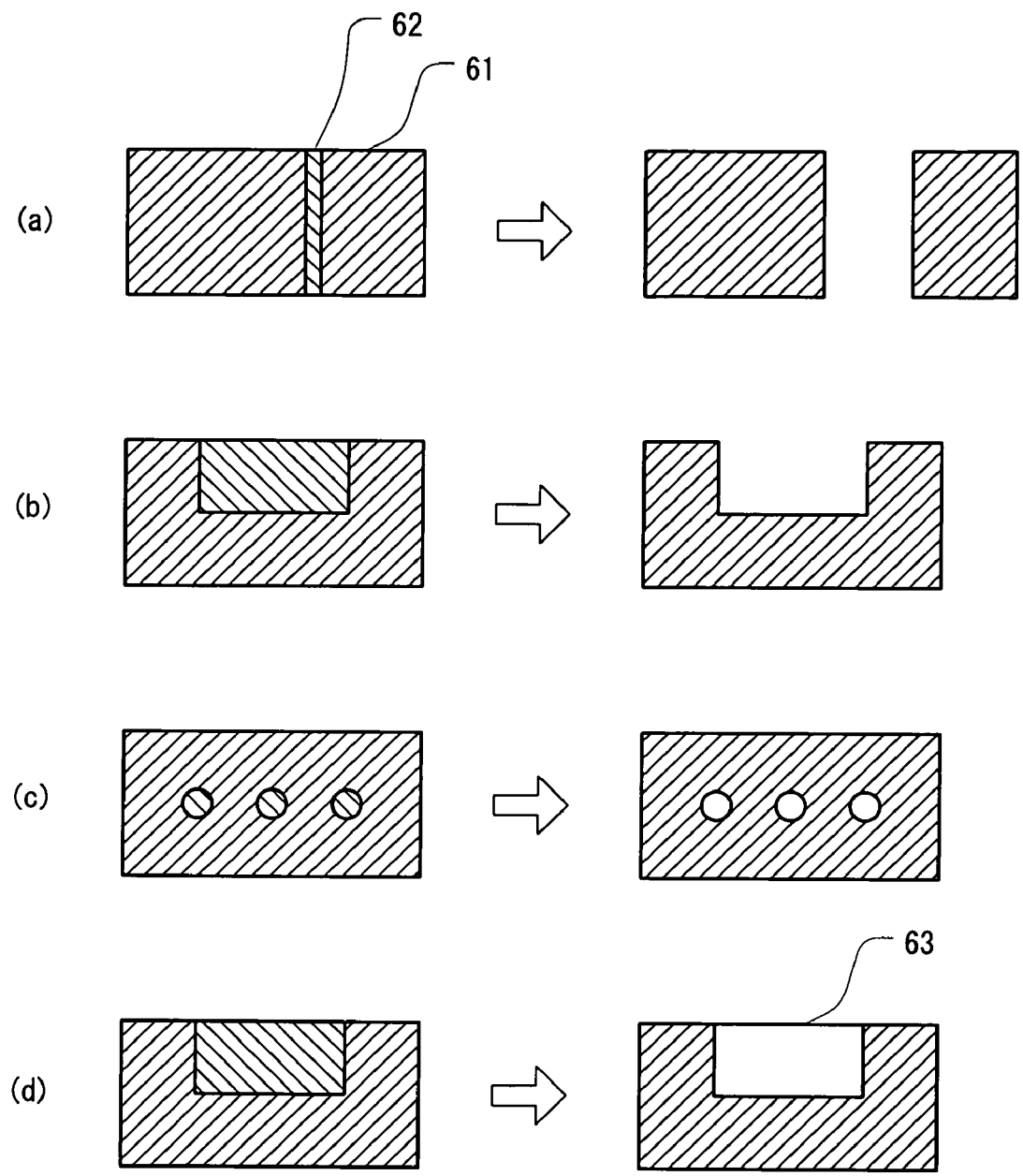
FIG. 5 is a diagram showing an example of the working of the macromolecular crystal.

FIG. 5 shows examples of working of a macromolecular crystal. In FIG. 5, 61 indicates the macromolecular crystal, 62 indicates the portion of the macromolecular crystal that is irradiated with ultraviolet light, and 63 indicates the modified part. The same hatching indicates the same thing in each figure. Furthermore, the left side shows the state prior to working, and the right side shows the state after working.

(a) indicates cutting; here, cutting is performed by irradiating the cut part with ultraviolet short-pulse laser light so that the chemical bonds of the crystal are broken, and scattering the cut part by volatilization. The cut macromolecular crystal can be used for X-ray diffraction measurements and in biodevices. Cutting can be performed in a state in which no shear stress is applied. (b) indicates removal; here, a specified portion of the macromolecular crystal is removed by irradiating a region of a specified shape with ultraviolet short-pulse laser light, so that the portion corresponding to this region is volatilized, and performing cutting along the boundaries of this region. The remaining macromolecular crystal can be used for X-ray diffraction measurements and in biodevices. Furthermore, in the figures from (b) on, the parts showing the same hatching as in (a) respectively indicate the same macromolecular crystal and ultraviolet short-pulse laser light irradiation areas as in (a).

(c) indicates hole boring; here, holes are formed by irradiating specified portions of the macromolecular crystal with ultraviolet short-pulse laser light. The macromolecular crystal in which these holes are formed can be used in biodevices.

(d) indicates modification; here, the nature of the crystal in the irradiated area is intentionally lost by irradiating a specified portion of the crystal with ultraviolet short-pulse laser light. This macromolecular crystal can be used for X-ray diffraction measurements and in biodevices.

Incidentally, in cases where a macromolecular crystal object of working is worked, it is necessary to confirm the location on the object of working that is irradiated with ultraviolet short-pulse laser light. However, since the ultraviolet short-pulse laser light cannot be visually observed, it is desirable to use this system in combination with an optical microscope.

Figure 6:
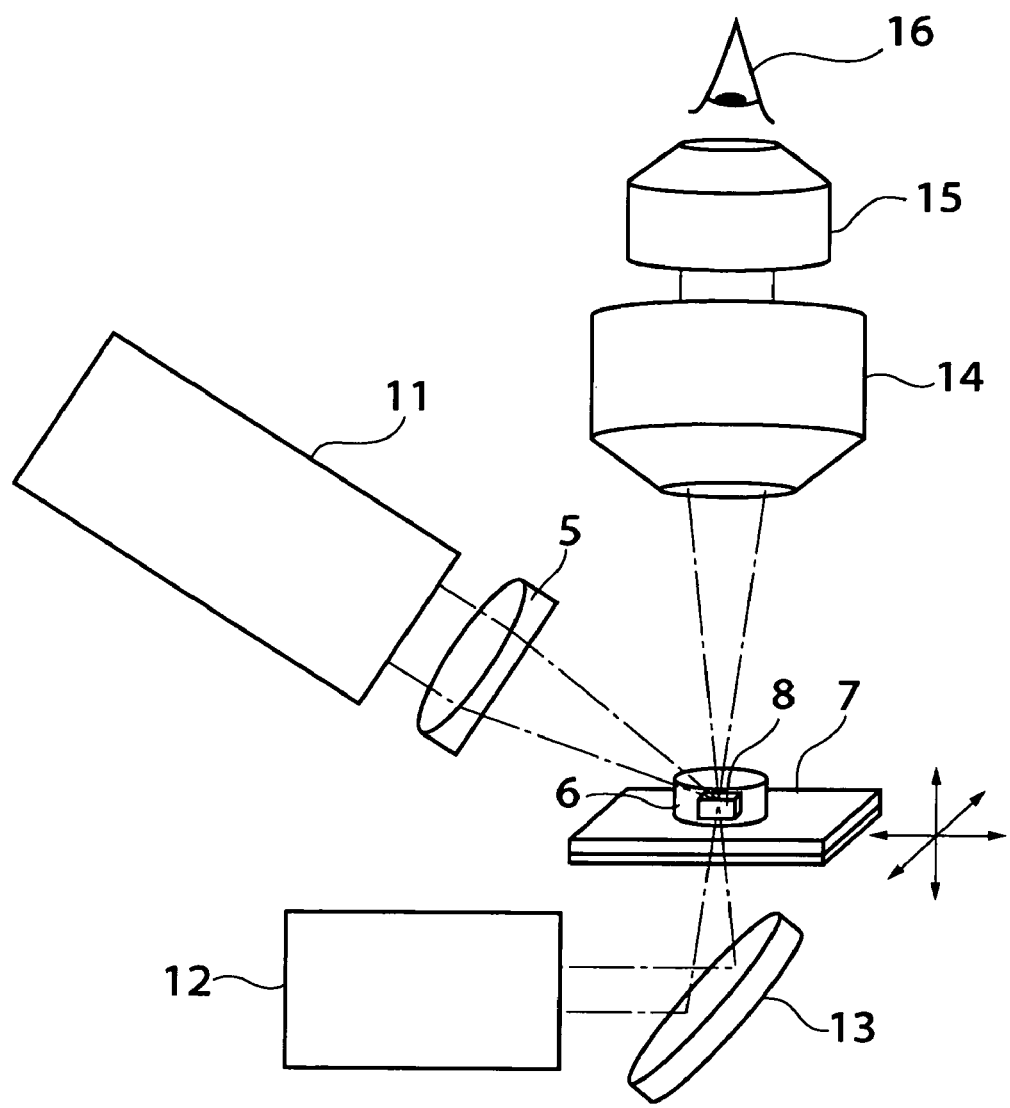
FIG. 6 is a diagram showing an example which is devised so that the ultraviolet short-pulse laser system is used in combination with an optical microscope.

An example of this is shown in FIG. 6. In the optical system shown in (a), the ultraviolet short-pulse laser light from the ultraviolet short-pulse laser system 11 (corresponding to the symbols 1 through 4 in FIG. 1) is focused at a specified point via a focusing optical system 5. The stage 7 has the function described in FIG. 1, and a sample container 6 containing the macromolecular crystal 8 is carried on the stage 7. Visible light from an illuminating light source 12 is reflected by a reflective mirror 13, and causes Koehler illumination of the sample container 6. The macromolecular crystal 8 is visually observed by the eye 16 via the object lens 14 and ocular lens 15 of an optical microscope.

A cruciform mark is formed in the position of the optical axis of the optical microscope, so that the position of the optical axis can be visually observed. Furthermore, the focal position (position of the focus, i.e., the object plane that is in focus when visually observed) of the optical microscope is fixed. The system is arranged so that the ultraviolet short-pulse laser light that is focused by the focusing optical system 5 is focused at the position of the optical axis of the optical microscope, and at the focal position of the optical microscope. Accordingly, in cases where the object of working is carried on the stage 7, and an image of this object of working is observed with the optical microscope, the image is focused, and the ultraviolet short-pulse laser light from the ultraviolet short-pulse laser system 11 is focused at a position located at the center of the cruciform mark. Furthermore, the relative positional relationship of the ultraviolet short-pulse laser system 11, focusing optical system 5 and optical microscope part is fixed, with only the stage 7 being able to move relative to these fixed systems.

Accordingly, working of the desired location and working of the desired shape can be accomplished by moving the stage 7 so that the location that is to be worked is positioned at the optical axis position and focal position of the optical microscope. If it is desired to perform working automatically, then it is necessary merely to attach an automatic focus adjustment device to the optical microscope, drive the stage 7 by means of commands from this adjustment device, and drive the stage 7 so that a predetermined specified part of the stage 7 is located on the optical axis of the optical microscope. Alternatively, the system may also be devised so that the stage 7 is driven in two dimensions or three dimensions by a servo mechanism after the reference position is initially aligned.

Figure 7:
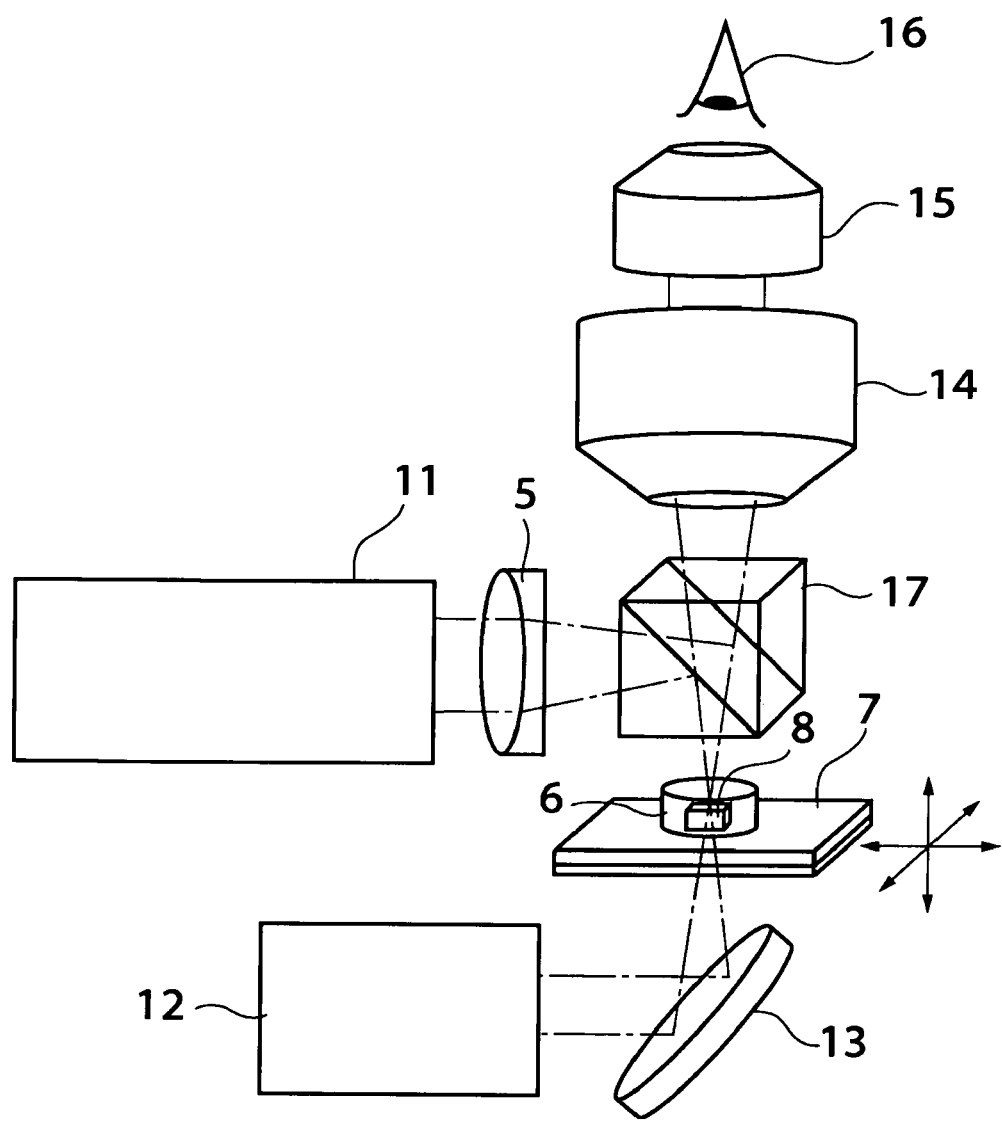
FIG. 7 is a diagram showing an example which is devised so that the ultraviolet short-pulse laser system is used in combination with an optical microscope.

FIG. 7 is a diagram showing another example in which an ultraviolet short-pulse laser system is combined with an optical microscope. In this example, the system is devised so that the ultraviolet short-pulse laser light irradiates the macromolecular crystal along the optical axis of an optical microscope. The ultraviolet short-pulse laser light 9 emitted from the ultraviolet short-pulse laser system 11 passes through a focusing optical system 5, and is then incident on a beam splitter 17 so that this light is reflected and caused to irradiate the macromolecular crystal along the optical axis of the optical microscope. The optical microscope itself has the same construction as that shown in FIG. 6; however, visible light advances directly through the beam splitter 17, and is observed by the eye 16 via an object lens 14 and ocular lens 15. As in the system shown in FIG. 6, the focal position of the ultraviolet short-pulse laser light is located on the optical axis of the optical microscope, and at the focal position of the optical microscope, and the positional relationship of the ultraviolet short-pulse laser system 11, focusing optical system 5 and optical microscope is fixed.

Specifically, the two working configurations differ as follows: namely, in the working configuration shown in FIG. 6, the ultraviolet short-pulse laser light irradiates the macromolecular crystal at an oblique angle, while in the present working configuration, the macromolecular crystal is perpendicularly irradiated. A beam splitter 17 is installed in order to realize this. As a result, the working precision is accurate, and perpendicular cutting is possible. The remaining functions such as the detection of the irradiation position are the same as in the system shown in FIG. 6; accordingly, a description is omitted.

Furthermore, as a modification of the construction shown in FIG. 7, a construction is also conceivable in which the beam splitter 17 is disposed between the object lens 14 and ocular lens 15, the object lens 14 is used as a focusing lens, and the focusing optical system 5 is omitted. Moreover, a construction is also conceivable in which the ultraviolet short-pulse laser system 11 and focusing optical system 5 are disposed directly above the stage 7, the macromolecular crystal is perpendicularly irradiated, the object of irradiation is illuminated by means of visible light from beneath the stage 7, and an optical microscope is installed beneath the stage 7.

Figure 8:
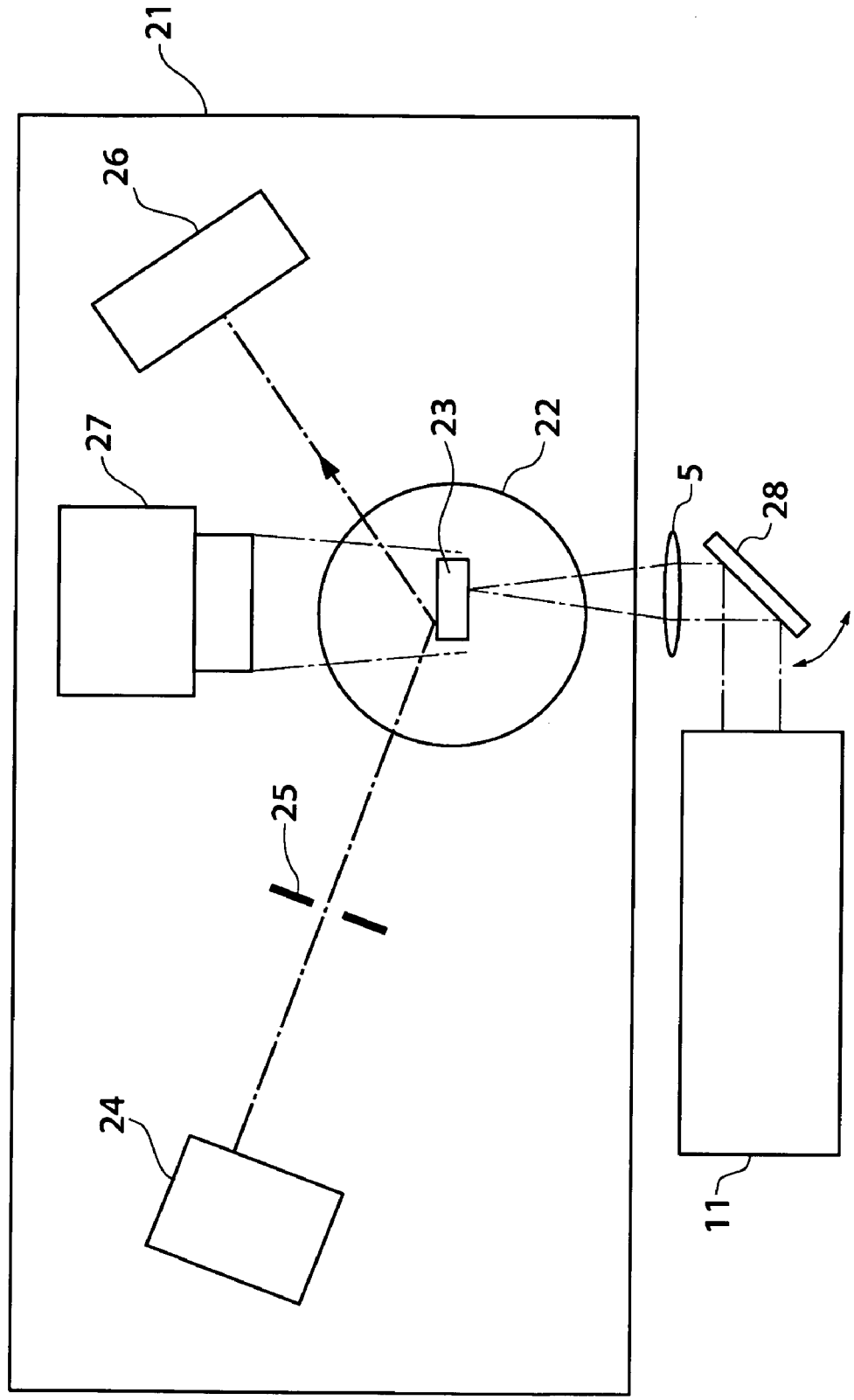
FIG. 8 is a diagram showing an example in which the macromolecular crystal working apparatus is incorporated into an X-ray diffraction device.

FIG. 8 shows an example in which a macromolecular crystal working apparatus is incorporated into an X-ray diffraction device which is a sample observation device. A stage 22 is installed in the X-ray diffraction device main body part 21, and a macromolecular crystal 23 constituting a measurement sample is carried on this stage 22. X-rays from an X-ray generating device 24 are narrowed down by a slit 25, and are then caused to irradiate the macromolecular crystal 23; the X-rays diffracted by the irradiated surface are detected by a detector 26, and the X-ray diffraction pattern is observed. A sample monitoring camera 27 is provided for use in the positioning of the sample and the like.

In this working configuration, in the X-ray diffraction device main body part 21, ultraviolet short-pulse laser light from the ultraviolet short-pulse laser system 11 is focused by a focusing optical system 5 via a reflective mirror 28, and is caused to irradiate the macromolecular crystal 23 so that working is performed. The stage 22 has the function of the stage 7 in FIG. 1; as a result of the movement of this stage 22, the macromolecular crystal 23 can be worked into a desired shape. The working method used is the working method described above. However, the positioning of the sample is performed not by visual inspection, but rather on the basis of an image picked up by the sample monitoring camera 27.

When working is completed, the worked macromolecular crystal 23 is irradiated on the spot with X-rays from the X-ray generating device 24, and the X-ray diffraction pattern is detected. In cases where the worked state is insufficient so that a favorable X-ray diffraction pattern cannot be obtained, reworking of the macromolecular crystal can immediately be performed on the spot.

Furthermore, in cases where X-ray crystal structure analysis of the macromolecular crystal is performed, this crystal is ordinarily transferred to a measurement jig such as that shown in FIG. 4(*j*) or (*k*), and is mounted in an X-ray crystal structure analysis device. However, since the growth and manipulation of macromolecular crystals are difficult, damage that is newly generated during the transfer operation may be added to defects and damage present from the initiation of growth, so that the crystal that is placed in the measurement device may include portions in which the crystal quality is clearly inferior. In such cases, measures involving irradiation with X-rays are often taken only in areas where the crystal quality appears to be high; however, depending on the location of the damage, it may not be possible to handle such situations. In principle, the most superior treatment method is a method in which measurements are performed after the damaged portions have been completely removed. However, treatment by means of a conventional mechanical working method after the macromolecular crystal has been set in the measurement device is extremely difficult from a practical standpoint.

On the other hand, the working method of the present invention using a laser provides working that does not require mechanical contact. Accordingly, if the present invention is applied, the crystals disposed in FIGS. 4(*j*) and (*k*) can easily be worked without again being removed.

Figure 9:
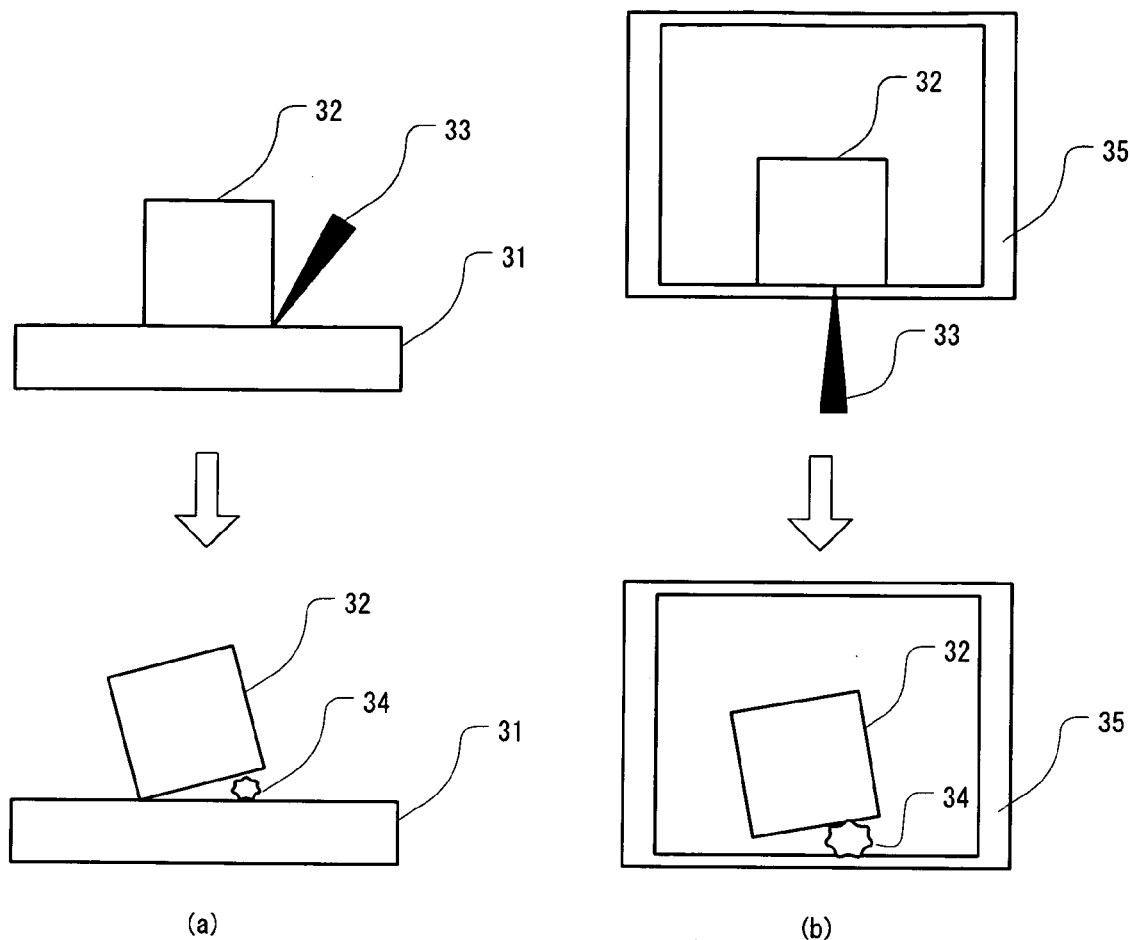
FIG. 9 is a diagram showing an outline of a macromolecular crystal stripping method constituting one working configuration of the present invention.
Figure 1:
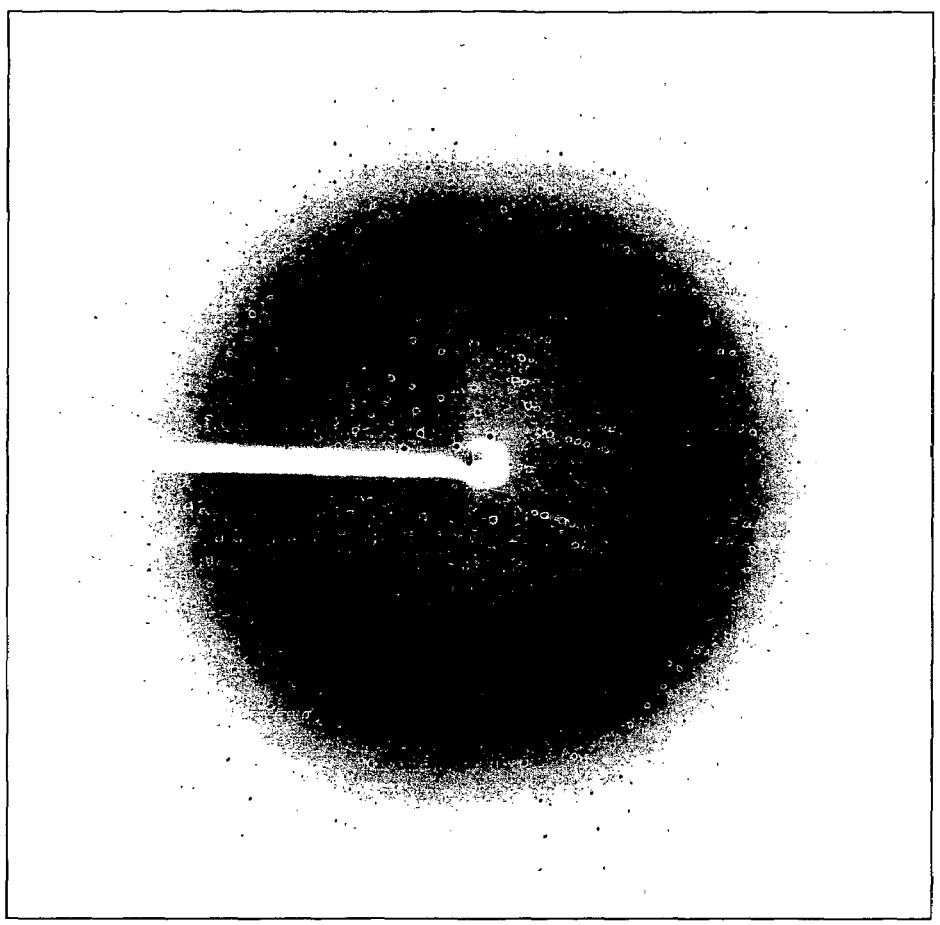

FIG. 9 shows an outline of a macromolecular crystal stripping method constituting one working configuration of the present invention. In FIG. 9, (a) shows a stripping method used in a case where a macromolecular crystal object of stripping 32 is adhering to an opaque substance 31, and (b) shows a stripping method used in a case where a macromolecular crystal object of stripping 32 is adhering to a transparent substance 35.

In the case shown in (a), irradiation is performed with the ultraviolet short-pulse laser light 33 focused on the boundary between the opaque substance 31 and the object of stripping 32. Consequently, laser ablation occurs at the laser irradiation point, so that the pressure in this area is elevated. In particular, in cases where there are substances that are vaporized by ablation, gas bubbles 34 are generated, and the object of stripping 32 is stripped by the pressure of these gas bubbles.

In the case shown in (b), irradiation is performed with the ultraviolet short-pulse laser light 33 focused on the interface between the transparent substance 35 and the object of stripping via the transparent substance 35 from the side surface on the opposite side from the surface to which the object of stripping 32 is adhering. Consequently, laser ablation occurs at the laser irradiation point, so that the pressure in this area is elevated. In particular, in cases where there are substances that are vaporized by ablation, gas bubbles 34 are generated, and the object of stripping 32 is stripped by the pressure of these gas bubbles.

There are no particular restrictions on the state of "adhesion"; for example, this includes cases where a substance and the object of stripping adhere to each other as a result of the surface tension of a liquid, cases where adhesion occurs as a result of the viscosity of a viscous liquid or solid, cases where adhesion occurs as a result of freezing or the like, and also includes cases where macromolecular crystals adhere to each other.

Furthermore, it would also be possible to strip only a portion of the adhering part by the method of the present invention, and then to strip the entire substance by some other method using this stripping point as a reference. In other words, the "stripping" of the present invention is not limited to cases where the object of stripping is completely stripped.

It is sufficient if the wavelength of the irradiating laser light is in a wavelength region that is absorbed by the object of stripping. Ultraviolet light is naturally used in order to prevent heat damage to the object of stripping; in cases where the object of stripping is a protein crystal, it is desirable that the wavelength of this light be 300 nm or less, preferably 250 nm or less. Furthermore, it is desirable that the pulse width be 1 μs or less, preferably 10 ns or less.

There are no particular restrictions on the number of irradiating pulses, as long as this number is in a range that makes it possible to perform stripping without damaging the macromolecular crystal. Depending on the type of macromolecular crystal involved, it may be possible in some cases to perform stripping with a single pulse. Furthermore, the energy density of irradiation can be appropriately selected in accordance with the type of macromolecular crystal and the type of laser used.

There are no particular restrictions on the irradiation spot diameter. Even an irradiation spot that is smaller than the size of the adhesion surface is effective. In the case of protein crystals, there may be instances in which even an irradiation spot that is approximately 1/1000 the surface area of the adhesion surface is effective. Moreover, stripping over a broad surface can also be performed by scanning the irradiation spot.

EMBODIMENT 1

In order to investigate the basic characteristics of the working method of the present invention, a protein single crystal was irradiated with ultraviolet short-pulse laser light having a wavelength of 193 nm using an apparatus of the type shown in FIG. 1; as a result, the crystal was cut in two. The X-ray diffraction pattern of the crystal following cutting was measured, and a structural analysis was performed.

A hen-egg white lysozyme protein was selected as the model macromolecule, and a single crystal of this protein was grown in a sample container by the vapor diffusion method. The crystal growth solution used was as follows: namely, a 25 mg/ml solution of the hen-egg white lysozyme sample (re-purified 6 times) was prepared, and this was mixed at a 1:1 ratio with a solution adjusted so that sodium chloride was present at a concentration of 60 mg/ml in a 0.1 M acetic acid buffer solution adjusted to a PH of 4.5; 10 μl of the resulting solution was used. 400 μl of a solution adjusted so that sodium chloride was present at a concentration of 60 mg/ml in a 0.1 M acetic acid buffer solution adjusted to a pH of 4.5 was added as an external solution.

This sample container was allowed to stand for 14 days at a constant temperature of 20° C., thus producing a single crystal having a size of approximately 0.15 mm×0.35 mm×0.1 mm. The protein solution in which this crystal was present was removed, so that light absorption by the solution was positively avoided. Furthermore, the hen-egg white lysozyme crystal was tightly sealed by means of fused-silica glass in a state in which droplets of the external liquid were left in the vicinity of the crystal in order to avoid denaturation of the crystal due to drying; then, this sample was placed on a stage capable of triaxial movement along the X, Y and Z axes. The maximum movement speed of the stage was 5 mm/sec, and the positional resolution was 1 μm. FIG. 10(*a*) shows a crystal photograph prior to irradiation with ultraviolet short-pulse laser light. The substance showing a long slender hexagonal shape in the photograph is the hen-egg white lysozyme crystal.

Generally, proteins show an extremely large absorption at wavelengths of 200 nm or less, as is indicated by the absorption coefficient of the hen-egg white lysozyme aqueous solution (1 mg/ml) in the ultraviolet region shown in FIG. 2. In this region, the depth to which light invades the crystal is a few microns or less, so that desired surface working with less effect on surrounding areas is possible. Accordingly, in the present embodiment, short-pulse laser light in the deep ultraviolet region with a wavelength of 200 nm or less was selected as the irradiating light.

A solid-state ultraviolet short-pulse laser light source with a wavelength of 193 nm was used as the ultraviolet short-pulse laser light generating means. The construction of this light source is as follows. A single mode laser diode is directly modulated so that pulsed light with a wavelength of 1547 nm and a repetition frequency of 1 kHz is generated. This pulsed light is amplified approximately 2,000,000 times by erbium-doped fiber amplifiers connected in series in a total of three stages. Next, the output light from the fiber amplifiers is converted into the eighth harmonic by a five-stage wavelength conversion process using nonlinear optical crystals as shown in FIG. 3, thus producing light with a wavelength of 193 nm.

After the ultraviolet short-pulse laser light 9 generated by the ultraviolet short-pulse laser light source 1 was passed through the shutter 2, this light was focused by a fused-silica lens with a focal distance of 100 mm (constituting the focusing optical system 5), so that irradiation was performed in the direction of the Z axis from the upper surface of a sample container 6 containing an hen-egg white lysozyme crystal (macromolecular crystal) 8, which was carried on the stage 7. The irradiation position on the crystal was finely adjusted while observing this position with an optical microscope. The pulse energy of the irradiating light on the crystal was 0.25 μJ, the spot diameter was 25 μm, and the fluence was 50 mJ/cm$^2$, the average power was 0.25 mW, and the pulse temporal width was 1 ns.

The spot position on the crystal was varied by causing the stage 7 to perform a linear reciprocating operation within the XY plane at a movement speed of 0.5 mm/sec and a one-way movement distance of 0.5 mm. As a result of this reciprocating operation being performed continuously, the same location was irradiated several times with ultraviolet short-pulse laser light. When irradiation was continued while observing the conditions of working with a microscope, the hen-egg white lysozyme crystal was successfully cut by irradiation with a total of approximately 100,000 pulses. The total volume of the crystal ablated by the working in this irradiation was approximately 0.0006 mm$^3$. FIG. 10(*b*) shows a stereomicrograph of the hen-egg white lysozyme crystal after cutting. It was confirmed that working could be accomplished by irradiation with ultraviolet short-pulse laser light without causing any mechanical damage such as cracking to the non-irradiated portions.

After the cut crystal had been allowed to stand for 2 hours, X-ray structural analysis was performed at a room temperature. In this measurement, an ultraX18 (voltage 50 kV, current 100 mA) manufactured by Rigaku Denki Co. was used as the X-ray generating device, and a RAXIS IV++ was used as the detector. The distance between the crystal and the detector was set at 150 mm, the detection angle was set at 2°, and the measurement time was set at 30 minutes/2°. The diffraction resolution of the crystal worked with ultraviolet short-pulse laser light was 0.19 nm, which was exactly the same as the diffraction resolution of an unworked crystal grown under the same conditions. FIG. 11 shows the X-ray diffraction pattern that was obtained. As is shown in this figure, a clean diffraction pattern was obtained. As a result, no deleterious effects on crystal quality were seen in crystal working by irradiation with ultraviolet short-pulse laser light, thus confirming that good working can be performed.

Vickers hardness is one index for quantitatively expressing the hardness (mechanical strength) of substances. Table 1 shows the Vickers hardness of several crystals. A larger value indicates that a substance is harder. Since KTiOPO$_4$, KH$_2$PO$_4$, and the like, which are inorganic crystals, have a sufficient mechanical strength, working techniques for cutting, planing, polishing, and the like have been established for these crystals. On the other hand, DAST, thienychalcone, and the like, which are organic crystals, have a low hardness compared to inorganic crystals, so that the working of such crystals by means of existing all-purpose machines is difficult, and requires a high degree of skill and special equipment. Generally, in cases where an all-purpose working apparatus is used, a Vickers hardness of 50 kgf/mm$^2$ or greater is required, while in cases where an expensive special working apparatus is used, a Vickers hardness of 10 kgf/mm$^2$ or greater is required. Meanwhile, the Vickers hardness of a hen-egg white lysozyme crystal, which is a protein crystal, is extremely small, at 0.2 kgf/mm$^2$, so that the working methods for inorganic and organic crystals described above cannot be applied.

TABLE 1

Vickers hardness values of various crystals.

| | Material | Vickers hardness (kgf/mm$^2$) |
|---|---|---|
| Inorganic crystals | KTiOPO$_4$ | 566 |
| | KH$_2$PO$_4$ | 135 |
| Organic crystals | DAST | 49 |
| | Thienylchalcone | 12 |
| Macromolecular crystal | Hen-Egg white lysozyme | 0.2 |

EMBODIMENT 2

Hole boring working was performed using the same apparatus as that described in Embodiment 1, so that a rectangular cavity was formed in the central portion of the crystal. The hen-egg white lysozyme was selected as the model macromolecule, and a single crystal of this protein constituting the object of working was grown in a sample container using the same growth method and growth conditions as in Embodiment 1. Subsequently, the protein solution in which the crystal was present was removed in the same manner as in Embodiment 1, and the sample container 6 was tightly sealed in a state in which liquid droplets of the external solution were left. A photograph of the crystal prior to laser light irradiation is shown in FIG. 12. The size of the crystal was 0.4 mm×0.6 mm×0.3 mm. The sample container 6 was placed on a stage 7 capable of triaxial movement along the X, Y and Z axes, and the sample was irradiated with ultraviolet short-pulse laser light having a wavelength of 193 nm from the upper surface of the container (direction of the Z axis).

The repetition frequency of the irradiating light on the crystal was 1 kHz, the pulse energy was 0.25 µJ, the spot diameter was 25 µm, the fluence was 50 mJ/cm$^2$, the average power was 0.25 mW, and the pulse temporal width was 1 ns.

The irradiated portion was the central portion of the crystal, and a rectangular region with dimensions of 0.22 mm×0.17 mm was continuously irradiated with ultraviolet short-pulse laser light by continuously moving the stage 7 0.2 mm in the direction of the X axis and 0.15 mm in the direction of the Y axis within the XY plane perpendicular to the direction of the optical axis of the irradiating light (Z axis). The movement speed of the stage was set at 0.5 mm/sec, and the distance between adjacent laser spots was set at 0.5 µm. A rectangular cavity passing through the crystal was formed by performing irradiation for a total of approximately 500,000 pulses. It was possible to remove a total volume of approximately 0.01 mm$^3$ by photoablation using this irradiation. FIG. 12 shows a stereo micrograph of this hen-egg white lysozyme crystal following irradiation. FIG. 12(*a*) is a photograph of the crystal prior to working; the substance showing a substantially regular hexagonal shape is the hen-egg white lysozyme crystal. As is shown in FIG. 12(*b*), a square through-hole was formed in the center by this working.

The present embodiment shows that not only cutting of the object of working, but also the removal by working of a desired region of the object of working, can be accomplished by irradiation with ultraviolet short-pulse laser light, and that the object of working can be shaped into a desired shape. Only the irradiated portions were removed by photoablation as a result of irradiation with ultraviolet short-pulse laser light; no serious damage such as chipping or cracking was observed in the non-irradiated portions. In the case of conventional crystal working methods using a blade or needle, working into a shape such as that performed in the present embodiment is extremely difficult. It was confirmed that worked shapes difficult to achieve in the case of conventional techniques can easily be achieved without damaging the crystal by applying working using ultraviolet short-pulse laser light irradiation in the present invention.

EMBODIMENT 3

Using the same apparatus as that used in Embodiment 1, cutting working was performed by irradiating a protein polycrystal with ultraviolet short-pulse laser light having a wavelength of 193 nm, so that a single crystal portion was separated from the polycrystal.

Figure 13:
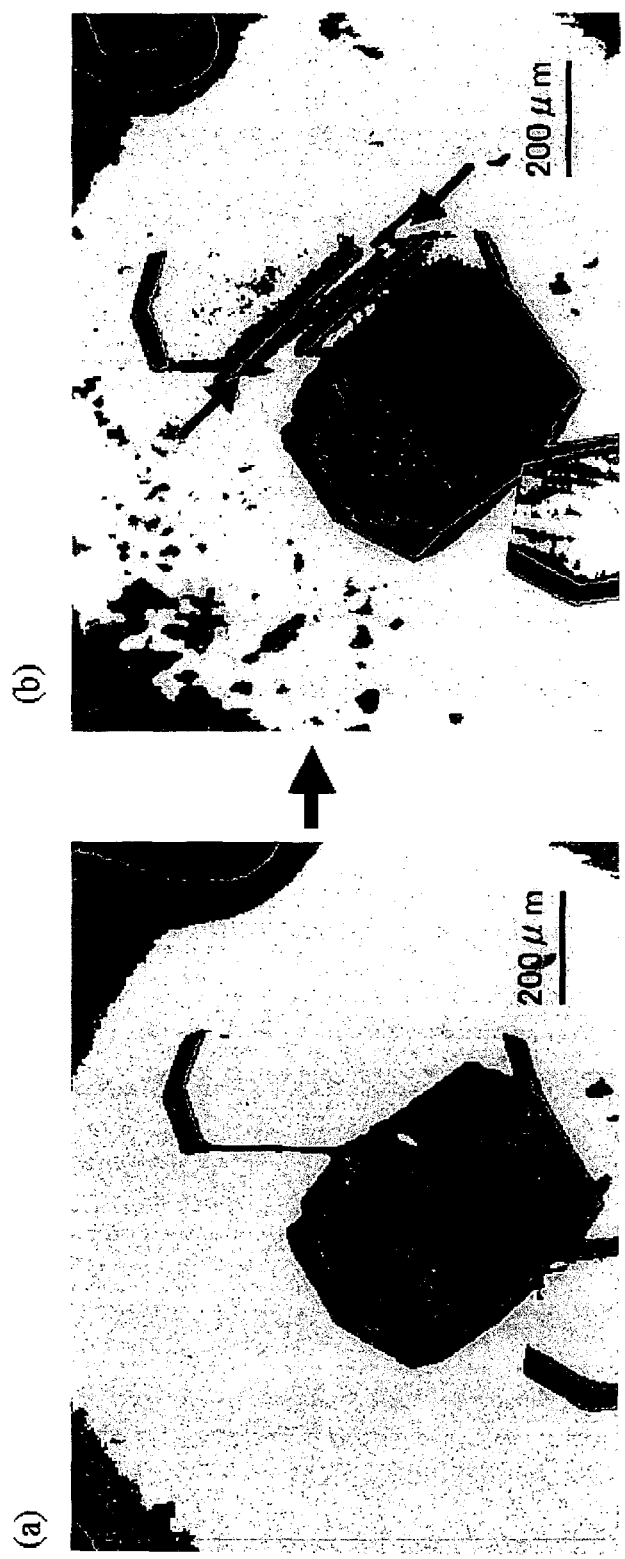
FIG. 13 is a diagram showing a photograph of a state in which a single crystal is separated by cutting a macromolecular polycrystal in a third embodiment of the present invention.

The growth conditions of the hen-egg white lysozyme polycrystal constituting the material being worked were also the same as in Embodiment 1 and Embodiment 2. FIG. 13(*a*) shows a photograph of the crystal prior to irradiation with ultraviolet short-pulse laser light. The macromolecular crystal 8 was not an ideal single crystal, but had the form of a polycrystal in which two single crystals (a single crystal appearing as a dark crystal in the center, and a long slender hexagonal crystal appearing to overlap on the right side of the first crystal) were conjoined.

The spot position on the crystal was varied by causing the stage 7 to perform a linear reciprocating operation at a movement speed of 0.5 mm/sec and a one-way movement distance of 0.5 mm by the same method as in Embodiment 1. As a result of this reciprocating operation being continuously performed, the same location was irradiated multiple times with ultraviolet short-pulse laser light. A single crystal portion was successfully cut from the polycrystallized crystal by irradiation with a total of approximately 100,000 pulses. FIG. 13(*b*) shows a stereomicrograph of the hen-egg white lysozyme crystal following cutting (in the figure, the area between the two arrows indicates the portion irradiated by ultraviolet short-pulse laser light, and the long slender hexagonal crystal on the right side is completely cut away from the central crystal). No serious damage was observed in the single crystal that was cut away.

Generally, in a polycrystal, the orientations of the plurality of single crystals that make up this polycrystal are not uniform; accordingly, in this state, it is difficult to perform X-ray crystal structure analysis. The results of the present embodiment indicated that the range of crystal shapes for which X-ray crystal structure analysis can be performed can be expanded by applying the present invention.

EMBODIMENT 4

Using the same apparatus as that used in Embodiment 1, and using human lysozyme (a protein crystal) as the material being worked, cutting of the crystal was performed. FIG. 14(*a*) shows a photograph of the crystal prior to laser irradiation.

The spot position on the crystal was varied by causing the stage 7 to perform a linear reciprocating operation within the XY plane at a movement speed of 0.5 mm/sec and a one-way movement distance of 0.2 mm. As a result of this reciprocating operation being continuously performed, the same location was irradiated multiple times with ultraviolet short-pulse laser light. When irradiation was continued while observing the conditions of working with a microscope, the human lysozyme crystal was successfully cut by irradiation with a total of approximately 100,000 pulses. FIG. 14(*b*) shows a stereomicrograph of the human lysozyme crystal following cutting. Droplets of the protein solution adhered to the surface of the crystal following cutting; however, no mechanical damage such as cracking occurred in the crystal.

EMBODIMENT 5

Figure 15:
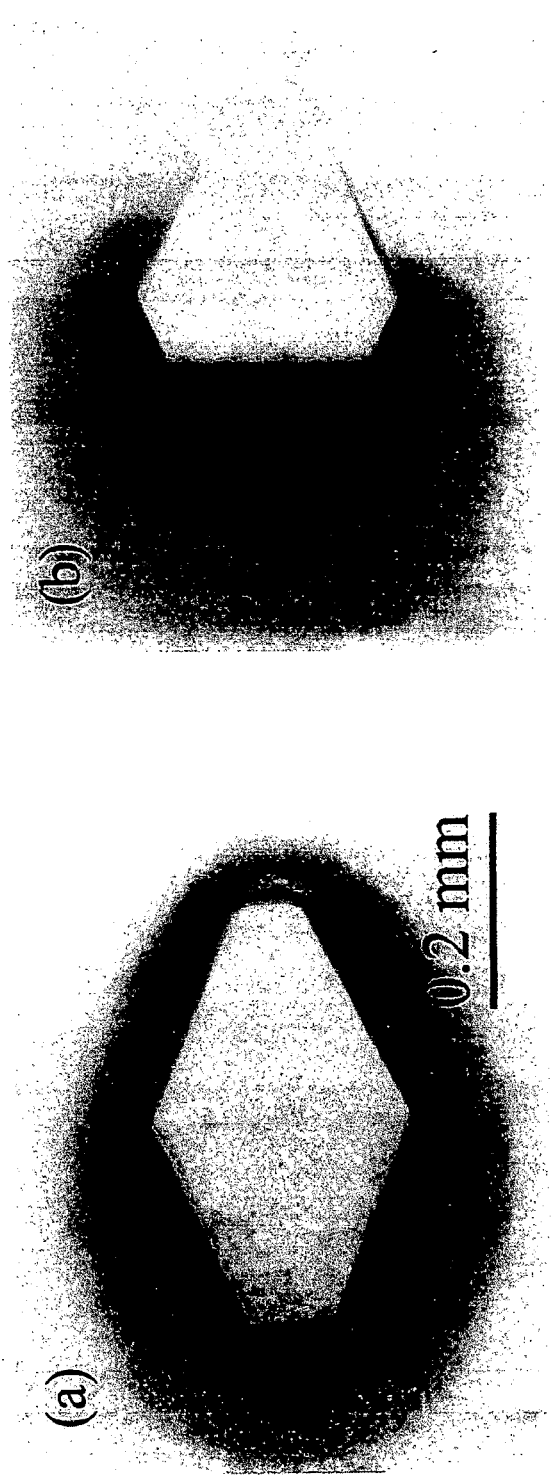
FIG. 15 is a diagram showing a photograph of the states before and after the removal of a portion of the macromolecular crystal in a fifth embodiment of the present invention.
Figure 1:
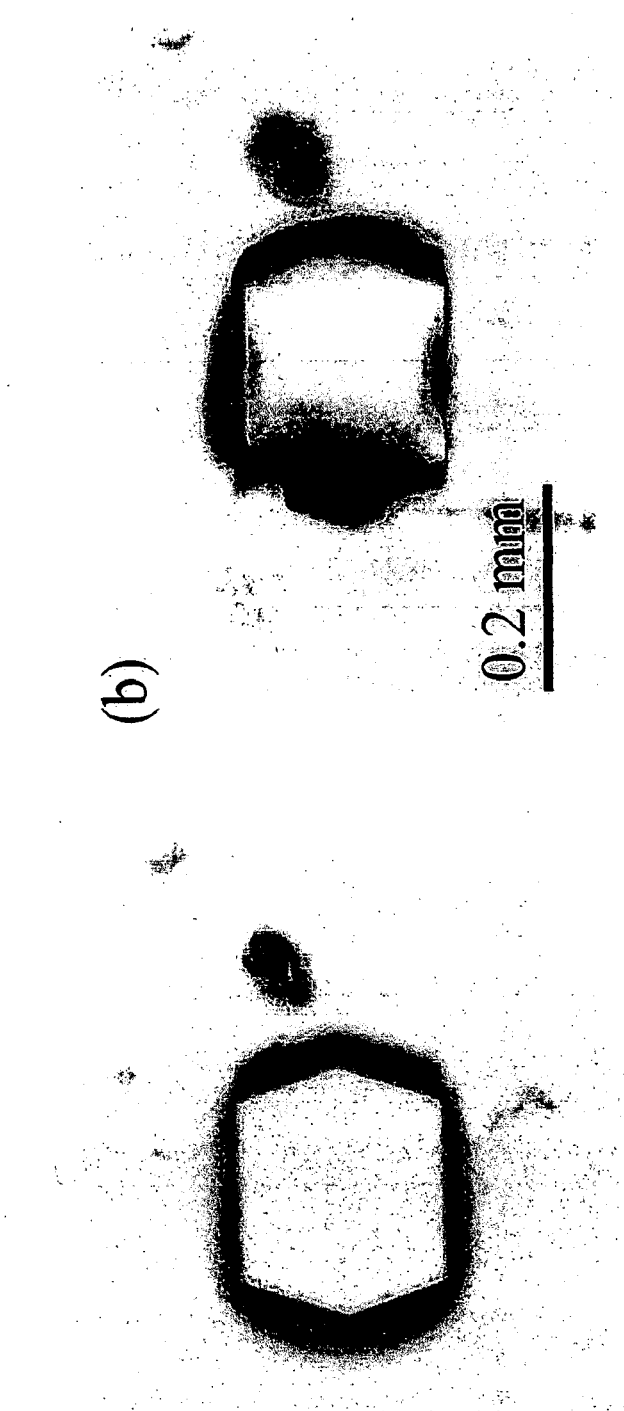

Using the same apparatus as that used in Embodiment 1, and using a phosphoenolpyruvate carboxylase (a protein crystal) as the material being worked, cutting of the crystal was performed. While the hen-egg white lysozyme crystal used in Embodiments 1 through 3 had a water content of approximately 40%, this crystal had a high water content of approximately 60%, and was therefore an extremely soft and brittle crystal even among protein crystals. FIG. 15(*a*) shows a photograph of the crystal prior to laser irradiation.

Working that removed a portion of the crystal was performed by irradiating the crystal with ultraviolet short-pulse laser light. The spot position on the crystal was varied by moving the stage 7 linearly in the XY plane at a movement speed of 0.5 mm/sec. As a result of this operation being continuously performed, the same location was irradiated multiple times with ultraviolet short-pulse laser light. Irradiation was continued while observing the conditions of working with a microscope, and a total volume of approximately 0.003 $mm^3$ was successfully removed by photoablation as a result of irradiation with a total of approximately 200,000 pulses. FIG. 15(*b*) shows a stereomicrograph of the phosphoenolpyruvate carboxylase crystal following irradiation. It was confirmed that only the portion of the crystal irradiated with ultraviolet short-pulse laser light was removed, and that working was performed without causing any mechanical damage such as cracking to the non-irradiated portions.

It was found by this embodiment and Embodiment 4 that the present invention is not only effective on a specified protein crystal, but can also be applied to other protein crystals. Furthermore, it was demonstrated that the present invention is also effective on macromolecular crystals belonging to a category of extremely soft substances.

EMBODIMENT 6

The cutting of a macromolecular crystal was performed using an apparatus having the same construction as that used in Embodiment 1, in which only the laser light source was different, i.e., in which the laser light source was a 221-nm solid ultraviolet short-pulse laser light source. This light source is constructed as follows. A single mode laser diode is directly modulated so that pulsed light with a wavelength of 1547 nm and a repetition frequency of 1 kHz is generated. This pulsed light is amplified approximately 2,000,000 times by erbium-doped fiber amplifiers connected in series in a total of three stages. Next, the output light from the fiber amplifiers is converted into the seventh harmonic by a wavelength conversion process with a total of four stages formed by removing only the final stage of the conversion process from the wavelength conversion process using non-linear optical crystals shown in FIG. 3, thus producing light with a wavelength of 221 nm.

The ultraviolet short-pulse laser light 9 generated by the ultraviolet short-pulse laser light source 1 shown in FIG. 1 was passed through the shutter 2, and was then focused by means of a fused-silica lens having a focal distance of 100 mm (constituting the focusing optical system 5), so that irradiation was performed from the upper surface of a sample container 6 containing the macromolecular crystal 8 placed on a stage 7, from a direction perpendicular to the stage 7. The irradiation position on the crystal was finely adjusted while being observed with an optical microscope. The pulse energy of the irradiating light on the crystal was 0.5 μJ, the spot diameter was 25 μm, the fluence was 100 mJ/$cm^2$, the average power was 0.5 mW, and the pulse temporal width was 1 ns.

A hen-egg white lysozyme crystal was selected as the material being worked, and the growth conditions were the same as in Embodiments 1 and 2. FIG. 16(*a*) shows a photograph of the crystal in the growth container prior to laser irradiation.

Working that removed a portion of the crystal was performed by irradiating the crystal with ultraviolet short-pulse laser light. The spot position on the crystal was varied by moving the stage 7 linearly at a movement speed of 0.5 mm/sec within the XY plane. As a result of this operation being continuously performed, the same location was irradiated multiple times with ultraviolet short-pulse laser light. When irradiation was continued while observing the conditions of working with a microscope, a total volume of approximately 0.001 mm³ was successfully removed by photoablation as a result of irradiation with a total of approximately 300,000 pulses. FIG. 16(*b*) shows a stereomicrograph of the hen-egg white lysozyme crystal following cutting. It was confirmed that working can be accomplished by means of irradiation with ultraviolet short-pulse laser light without causing mechanical damage such as cracking to the non-irradiated portions.

It was demonstrated by the present embodiment and Embodiments 1 through 5 that laser light with a wavelength of 193 nm and laser light with a wavelength of 221 nm are extremely desirable as the laser light used in the present invention. Furthermore, the fifth harmonic (wavelength 213 nm) of an Nd:YAG laser and the fifth harmonic (wavelength 210 nm) of an Nd:YLF laser, which have wavelengths between these two lasers, are also examples of desirable lasers.

EMBODIMENT 7

Figure 17:
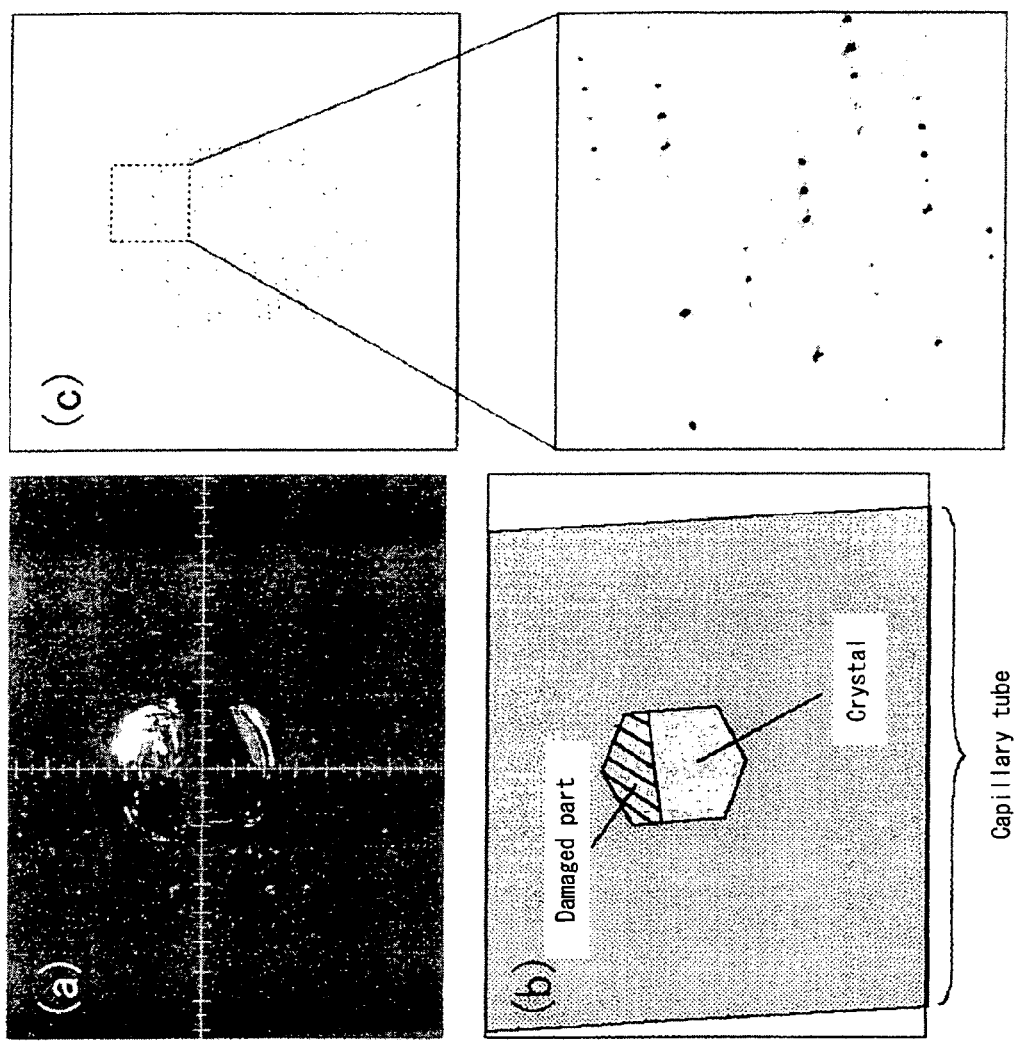
FIG. 17 is a diagram showing a photograph of the state of the macromolecular crystal and the X-ray diffraction results before the removal of a damaged portion in a seventh embodiment of the present invention.

A hen-egg white lysozyme crystal was selected as the material being worked, and the growth conditions were the same as in Embodiments 1 and 2. FIG. 17(*a*) shows a photograph of the crystal following the transfer of the crystal in the growth container into a fused-silica glass capillary tube (FIG. 4(*j*)) used for X-ray crystal structure analysis. FIG. 17(*b*) shows an illustration of this. It was confirmed that the crystal 8 was not a single crystal of ideal high quality, and that the upper part contained a local damaged part.

When the X-ray diffraction pattern of this crystal was measured by the same measurement method as in Embodiment 1 at an X-ray beam diameter of 0.4 mm, the diffraction pattern shown in FIG. 17(*c*) was obtained. This was a blurred diffraction pattern affected by the damaged part, and was unsuitable for use in detailed structural analysis.

Figure 18:
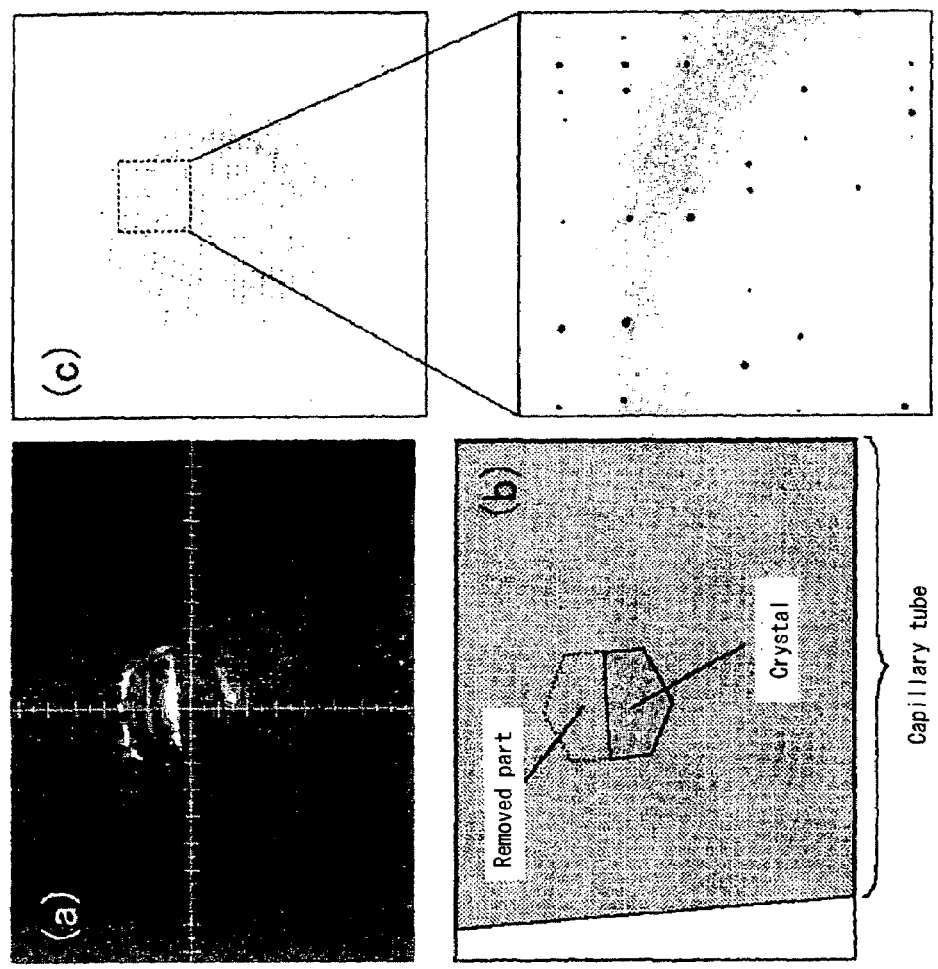
FIG. 18 is a diagram showing a photograph of the state of the macromolecular crystal and the X-ray diffraction results after the removal of a damaged portion in a seventh embodiment of the present invention.

Accordingly, the damaged part was selectively removed by irradiating this crystal with ultraviolet short-pulse laser light having a wavelength of 193 nm. The spot position on the crystal was varied by moving the stage 7 linearly at a movement speed of 0.5 mm/sec using the same method as in Embodiment 1. As a result of this reciprocating operation being continuously performed, the same location was irradiated multiple times with ultraviolet short-pulse laser light. The damaged part was completely removed by irradiation with a total of approximately 800,000 pulses. FIG. 18(*a*) shows a photograph of the hen-egg white lysozyme crystal following working, and FIG. 18(*b*) shows an illustration of this. It was confirmed that the damaged part (ablated area) was completely removed, and that no new damage was generated.

When the X-ray diffraction pattern was again measured for this crystal under the same conditions, a diffraction pattern that was far clearer than that obtained prior to laser irradiation was obtained, as is shown in FIG. 18(*c*).

In cases where a crystal is set in a jig used for X-ray crystal structure analysis, it is extremely difficult to work the crystal "as is" using conventional techniques. If the present invention is applied, damaged parts can easily be removed without removing the crystal even following transfer to the measurement jig. As a result, it was confirmed that the precision of structural analysis can be improved. Additional working can also be performed any number of times on the basis of the measurement results of the X-ray diffraction pattern.

EMBODIMENT 8

Figure 19:
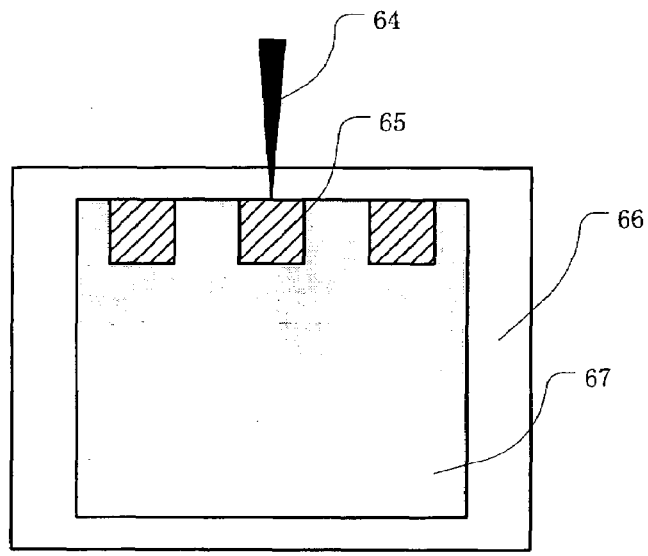
FIG. 19 is a model diagram showing the state of adhesion of the crystal prior to stripping in an eighth embodiment of the present invention.

As is shown in FIG. 19, the interface between one hen-egg white lysozyme crystal (protein crystal) adhering to the undersurface of the fused-silica glass on the upper side of a fused-silica glass container and this fused-silica glass was irradiated with laser light from the side of the upper surface of the fused-silica glass, so that one adhering hen-egg white lysozyme crystal was stripped. In FIG. 19, 64 indicates the laser light, 65 indicates the protein crystal, 66 indicates the fused-silica glass container, and 67 indicates a protein solution.

The laser used was a solid-state laser with a wavelength of 193 nm generated by a harmonic generation circuit such as that shown in FIG. 3; laser light with a pulse width of 1 ns was used as one shot of irradiation. The spot diameter was set at 25 μm, and the energy density was set at 50 mJ/cm².

Figure 20:
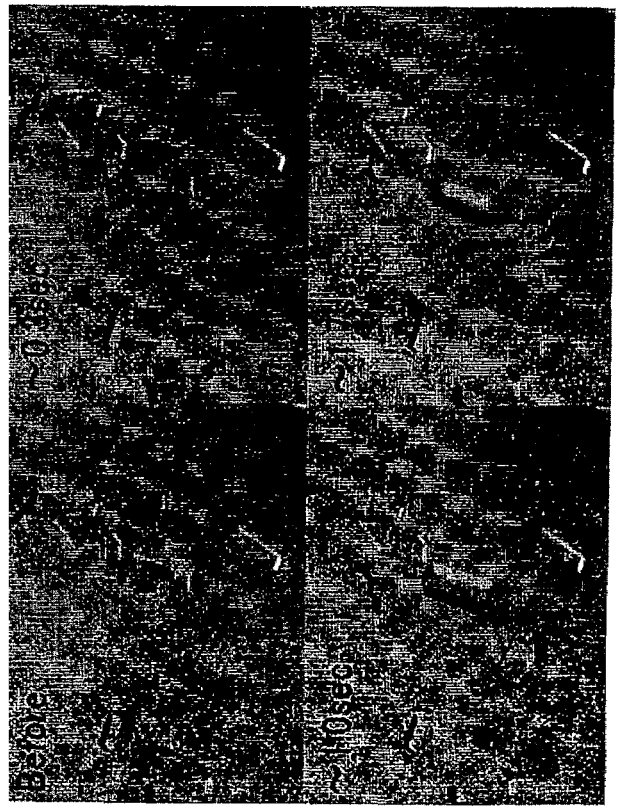
FIG. 20 is diagram showing how the stripped protein crystal drops off in an eighth embodiment of the present invention.

The results are shown in FIG. 20. It is seen that the crystals shown in the center in the respective photographs are stripped from the fused-silica glass and fall downward through the protein solution. In particular, it is seen that at the point in time at which 1 second has elapsed following laser irradiation, an image is picked up showing that the surface of the crystal is completely separated from the surface of the fused-silica glass, and that there is no damage to the stripped egg white lysozyme crystal. At the point in time at which 1.7 seconds has elapsed, the crystal is removed from the focal position of the camera, so that the image appears blurred.

EMBODIMENT 9

The interface between one YkrX crystal (a protein crystal originating in *Bacillus subtilis*) adhering to the undersurface of the fused-silica glass on the upper side of a fused-silica glass container and this fused-silica glass was irradiated with laser light from the side of the upper surface of the fused-silica glass in the same manner as in Embodiment 1, so that this adhering single YkrX crystal originating in *Bacillus subtilis* (size approximately 0.1 mm×0.1 mm×0.1 mm) was stripped.

The laser used was a solid laser with a wavelength of 193 nm generated by a harmonic generation circuit such as that shown in FIG. 3. The crystal was irradiated with laser light having a pulse width of 1 ns and a pulse repetition frequency of 1 kHz. The spot diameter was set at 25 μm, and the energy density was set at 50 mJ/cm². When the entire adhering surface was irradiated with laser light by a total irradiation of approximately 10,000 pulses, it was confirmed that the YkrX crystal originating in *Bacillus subtilis* was stripped from the fused-silica glass. This crystal adhered to the fused-silica glass even more strongly than the hen-egg white lysozyme crystal in Embodiment 8; however, it was indicated that an effective stripping operation could be performed on this crystal by irradiating the crystal with a plurality of laser pulses.

EMBODIMENT 10

Using the same apparatus as that used in Embodiment 1, and using a glucose isomerase crystal (a protein crystal) as the material being worked, a portion of the crystal was removed by ablation. This crystal has a molecular weight (173 kDa) that is more than 10 times larger than the molecular weight (14 kDa) of the hen-egg white lysozyme crystal used in Embodiment 1 and the like, so that crystallization and handling are more difficult than in the case of the hen-egg white lysozyme crystal.

A glucose isomerase crystal with a size of 0.2 mm×0.8 mm×0.1 mm was irradiated with ultraviolet short-pulse laser light, so that working that removed a portion of the crystal was performed. The spot position on the crystal was varied by moving the stage 7 linearly at a movement speed of 0.5 mm/sec in the XY plane. As a result of this operation being continuously performed, the same location was irradiated multiple times with ultraviolet short-pulse laser light. Irradiation was continued while observing the conditions of working with a microscope, and a total volume of approximately 0.004 mm$^3$ was successfully removed by photoablation as a result of irradiation with a total of approximately 300,000 pulses. It was confirmed that the crystal was removed only in the portions that were irradiated with ultraviolet short-pulse laser light, and that working was performed without any mechanical damage such as cracking to the non-irradiated portions.

As a result of the present embodiment, it was found that the present invention can also be applied to protein crystals that have a large molecular weight.

EMBODIMENT 11

Using the same apparatus as that used in Embodiment 1, and using an AcrB crystal (a membrane protein crystal) as the material being worked, a portion of the crystal was removed by ablation. Generally, membrane protein crystals are far more difficult to crystallize than water-soluble protein crystals, and the handling of such crystals is also difficult. FIG. 21(a) shows a photograph of the crystal prior to laser irradiation.

Working that removed a portion of the crystal was performed by irradiating this AcrB crystal with ultraviolet short-pulse laser light. The spot position on the crystal was varied by moving the stage 7 linearly at a movement speed of 0.5 mm/sec in the XY plane. As a result of this operation being performed continuously, the same location was irradiated multiple times with ultraviolet short-pulse laser light. Irradiation was continued while observing the conditions of working with a microscope, and a total volume of approximately 0.0001 mm$^3$ was successfully removed by photoablation as a result of a total irradiation of approximately 5,000 pulses. FIG. 21(b) shows a photograph of the crystal following laser irradiation. It was confirmed that the crystal was removed only in the portions that were irradiated with ultraviolet short-pulse laser light, and that working was performed without any mechanical damage such as cracking to the non-irradiated portions.

As a result of the present embodiment, it was found that the present invention can also be applied to membrane protein crystals.

EMBODIMENT 12

Using the same apparatus as that used in Embodiment 1, and using a 4-dimethylamino-N-methyl-4-stilbazolium tosylate (DAST) crystal (which is an organic nonlinear optical material) as the material being worked, the crystal was cut by irradiation with ultraviolet short-pulse laser light. Since this crystal has a low mechanical strength compared to inorganic materials, working by means of an all-purpose working machine is difficult.

A DAST crystal with a size of 1 mm×1 mm×0.2 mm was irradiated with ultraviolet short-pulse laser light, thus performing working that cut the crystal. The spot position on the crystal was varied by moving the stage 7 linearly at a movement speed of 0.5 mm/sec in the XY plane. As a result of this operation being performed continuously, the same location was irradiated multiple times with ultraviolet short-pulse laser light. Irradiation was continued while observing the conditions of working with a microscope, and the crystal was successfully cut as a result of a total irradiation of approximately 200,000 pulses. It was confirmed that the crystal was removed only in the portions that were irradiated with ultraviolet short-pulse laser light, and that working was performed without any mechanical damage such as cracking to the non-irradiated portions.

As a result of the present embodiment, it was found that the present invention can also be applied to organic crystals.

EMBODIMENT 13

The cutting of a macromolecular crystal was performed using an apparatus having the same construction as that used in Embodiment 1, with only the laser light source being different, i.e., using an apparatus based on the output light (wavelength 1064 nm) and harmonics of a Q-switching type Nd:YAG laser. An LBO crystal was used for the generation of the second harmonic (wavelength 532 nm) and third harmonic (wavelength 355 nm) (sum frequency of the fundamental wave and second harmonic), and a CLBO crystal was used for the generation of the fourth harmonic (wavelength 266 nm) (harmonic generated from the second harmonic) and the generation of the fifth harmonic (wavelength 213 nm) (sum frequency of the fundamental wave and fourth harmonic).

After being passed through the shutter 2, the short-pulse laser light generated by the short-pulse laser light source was caused to irradiate the macromolecular crystal from the upper surface of a sample container containing the macromolecular crystal placed on the stage, in a direction perpendicular to the stage, by focusing the light using a fused-silica lens with a focal distance of 100 mm (constituting the focusing optical system). The irradiation position on the crystal was finely adjusted while observing this position with an optical microscope. The repetition frequency of the irradiating light on the crystal was 1 kHz, the spot diameter was 25 μm, and the pulse time width was approximately 10 ns.

An hen-egg white lysozyme crystal was selected as the material being worked, and the growth conditions were the same as in Embodiments 1 and 2. Working that cut the crystal was performed by irradiating the crystal with laser light. The spot position on the crystal was varied by moving the stage 7 linearly at a movement speed of 0.5 mm/sec in the XY plane. As a result of this operation being performed continuously, the same location was irradiated multiple times with short-pulse laser light. Irradiation was continued while observing the conditions of working with a microscope.

With regard to the fluence of the laser light at respective wavelengths, the working characteristics were observed in the range of 0 to 120 J/cm$^2$ in the case of the fundamental wave, in the range of 0 to 60 J/cm$^2$ in the case of the second harmonic, in the range of 0 to 7 J/cm$^2$ in the case of the third harmonic, in the range of 0 to 6 J/cm$^2$ in the case of the fourth harmonic, and in the range of 0 to 4 J/cm$^2$ in the case of the fifth harmonic.

In the case of irradiation with the fundamental wave and second harmonic, the crystal did not absorb the irradiating light; accordingly, working could not be performed at the fluence values described above. In the case of irradiation with the third harmonic, working was possible if the fluence was increased; at the same time, however, it was found that this working was accompanied by damage. In the case of irradiation with the fourth harmonic and fifth harmonic, it was found that favorable working was possible. FIG. 22 shows the working results in the case of irradiation with the second harmonic (fluence 60 J/cm$^2$), third harmonic (fluence 7 J/cm$^2$), fourth harmonic (fluence 1 J/cm$^2$) and fifth harmonic (fluence 0.5 J/cm$^2$).

As a result of these embodiments, it was confirmed that a more desirable wavelength in the working of protein crystals is 300 nm or less, where protein crystals show absorption.

EMBODIMENT 14

The cutting of a macromolecular crystal was performed using an apparatus constituting a femtosecond ultra-short-pulse laser light source with a wavelength of approximately 780 nm. After being passed through the shutter, the ultra-short-pulse laser light generated by the femtosecond ultra-short-pulse laser light source was focused by an object lens, and was thus caused to irradiate the macromolecular crystal from the bottom surface of a sample container containing the macromolecular crystal in a direction perpendicular to the stage. The irradiation position on the crystal was finely adjusted while being observed with an optical microscope. The pulse energy of the irradiating light on the crystal was 1 μJ, the spot diameter was 5 μm, the repetition frequency was 1 kHz, and the pulse temporal width was 120 fs. An hen-egg white lysozyme crystal was selected as the material being worked, and the growth conditions were the same as in Embodiments 1 and 2.

Figure 23:
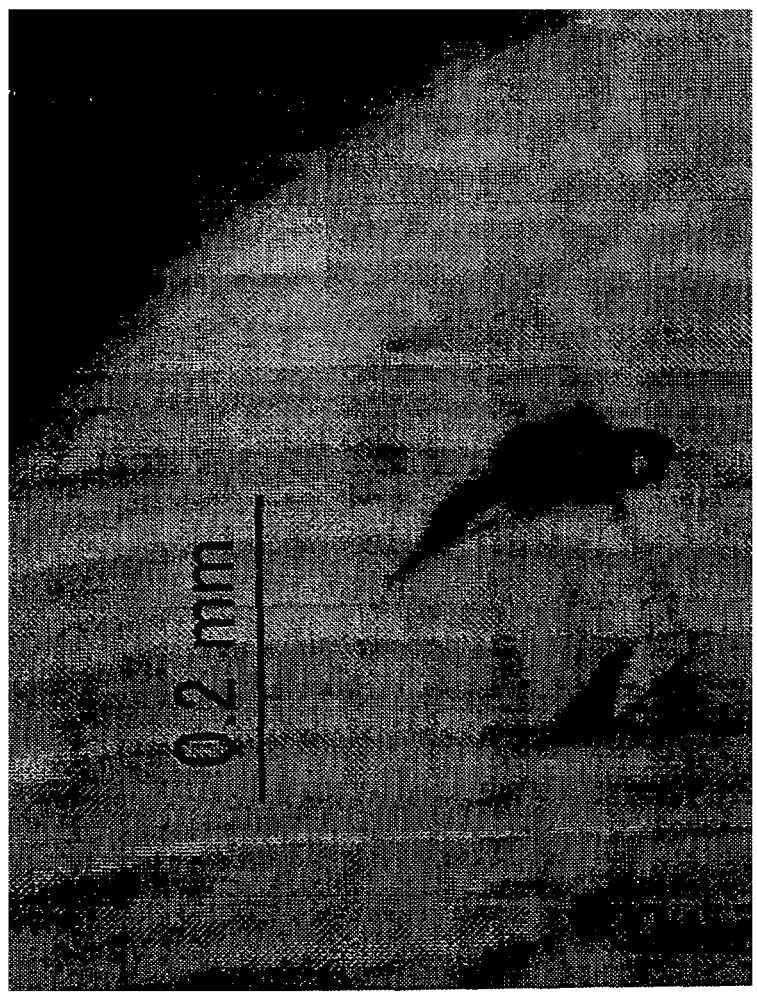
FIG. 23 is a diagram showing a stereomicrograph of an hen-egg white lysozyme crystal following laser irradiation.

The focus of the object lens was adjusted so that the focal point of the focused laser light was inside the crystal, and working of the crystal was performed by irradiating the crystal with a total of approximately 1,000 pulses of ultra-short-pulse laser light while moving the stage 7 linearly at a movement speed of 0.3 mm/sec in the XY plane. As a result, splitting of the crystal due to the generation of cracks was confirmed. FIG. 23 shows a stereomicrograph of the hen-egg white lysozyme crystal following laser irradiation. The crystal irradiated by laser light is cut into two parts; however, this is not cutting along the laser irradiation plane, but is rather caused by cracking occurring during laser irradiation.

It was indicated by the present embodiment that in the case of working from the interior of the crystal using femtosecond ultra-short-pulse laser light, damage to the object may be caused by impacts during working. Specifically, in the working of extremely brittle macromolecular crystals, it is desirable to perform only working from the crystal surface.

The invention claimed is:

1. A macromolecular crystal working method, comprising:
    working a macromolecular crystal by irradiating an ultraviolet short-pulse laser light having a wavelength in a range of 190-340 nm to the macromolecular crystal;
    wherein the working comprises stripping the macromolecular crystal, and the stripping comprises stripping the macromolecular crystal from a substance to which the macromolecular crystal is adhered.

2. The macromolecular crystal working method according to claim 1, further comprising relatively moving the macromolecular crystal and a position on the macromolecular crystal to which the laser light is irradiated.

3. The macromolecular crystal working method according to claim 1, wherein the macromolecular crystal is at least one crystal selected from a set consisting of resins, proteins, sugars, lipids and nucleic acids.

4. The macromolecular crystal working method according to claim 1, wherein an energy density per pulse of the ultraviolet short-pulse laser light is at least 1 mJ/cm$^2$.

5. A polymer crystal working method, comprising:
    working a polymer crystal by irradiating an ultraviolet short-pulse laser light to the polymer crystal;
    wherein the working comprises stripping the polymer crystal from a substance to which the polymer crystal is adhered.

6. The polymer crystal working method according to claim 5, further comprising relatively moving the polymer crystal and a position on the polymer crystal to which the laser light is irradiated.

7. The polymer crystal working method according to claim 5, wherein the polymer crystal is at least one crystal selected from a set consisting of resins, proteins, sugars, lipids and nucleic acids.

8. The polymer crystal working method according to claim 7, wherein the polymer crystal is a protein crystal.

9. The polymer crystal working method according to claim 8, wherein the ultraviolet short-pulse laser light has a wavelength of not more than 300 nm.

10. The polymer crystal working method according to claim 9, wherein the ultraviolet short-pulse laser light has a wavelength of not more than 250 nm.

11. The polymer crystal working method according to claim 8, wherein a pulse width of the ultraviolet short-pulse laser light is not more than 1 μs.

12. The polymer crystal working method according to claim 11, wherein the pulse width of the ultraviolet short-pulse laser light is not more than 10 ns.

13. The polymer crystal working method according to claim 5, wherein an energy density per pulse of the ultraviolet short-pulse laser light is at least 1 mJ/cm$^2$.

14. A macromolecular crystal working method, comprising:
    scooping up a sample solution and a macromolecular crystal in a loop;
    working the macromolecular crystal held with the sample solution by the loop by irradiating an ultraviolet short-pulse laser light to the macromolecular crystal;
    wherein the working comprises at least one of cutting, partially removing, boring holes, modifying a nature, pulverizing, and stripping the macromolecular crystal.

15. A macromolecular crystal working apparatus comprising:
    an ultraviolet short-pulse laser which emits an ultraviolet short-pulse laser light;
    an optical system which conducts the ultraviolet short-pulse laser light to a macromolecular crystal to be worked, which is held along with a sample solution by a loop adapted to scoop up the sample solution and the macromolecular crystal, and which focuses the laser light on a position of the macromolecular crystal; and
    a mechanism that varies a relative position of the macromolecular crystal and the position at which the laser light is focused.

* * * * *

UNITED STATES PATENT AND TRADEMARK OFFICE
CERTIFICATE OF CORRECTION

PATENT NO.         : 7,356,240 B2
APPLICATION NO.   : 11/372382
DATED              : April 8, 2008
INVENTOR(S)        : Hiroaki Adachi et al.

It is certified that error appears in the above-identified patent and that said Letters Patent is hereby corrected as shown below:

On the Title page:

Under item (73) Assignees;

add --Takatomo Sasaki, Suita-shi (JP)

Yusuke Mori, Katano-shi (JP)

Kazufumi Takano, Suita-shi (JP)

Tsuyoshi Inoue, Toyonaka-shi (JP)

Hiroyoshi Matsumura, Ibaraki-shi (JP)--.

Signed and Sealed this

Fifth Day of August, 2008

JON W. DUDAS
*Director of the United States Patent and Trademark Office*